United States Patent
Kim et al.

(10) Patent No.: US 10,845,904 B2
(45) Date of Patent: Nov. 24, 2020

(54) DISPLAY COMPRISING SENSING FUNCTION, AND ELECTRONIC DEVICE COMPRISING SAME

(71) Applicant: Samsung Electronics Co., Ltd., Gyeonggi-do (KR)

(72) Inventors: Youngdo Kim, Gyeonggi-do (KR); Yongman Lee, Gyeonggi-do (KR); Song Hee Jung, Gyeonggi-do (KR); Jung Hyun Kim, Gyeonggi-do (KR); Taesung Kim, Gyeonggi-do (KR); Hyunchang Shin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/083,031

(22) PCT Filed: Mar. 9, 2017

(86) PCT No.: PCT/KR2017/002543
§ 371 (c)(1),
(2) Date: Sep. 7, 2018

(87) PCT Pub. No.: WO2017/155319
PCT Pub. Date: Sep. 14, 2017

(65) Prior Publication Data
US 2019/0102016 A1    Apr. 4, 2019

(30) Foreign Application Priority Data
Mar. 9, 2016 (KR) .................. 10-2016-0028271

(51) Int. Cl.
*G06F 3/041* (2006.01)
*G06F 3/042* (2006.01)
(Continued)

(52) U.S. Cl.
CPC .......... *G06F 3/0412* (2013.01); *G02F 1/1333* (2013.01); *G02F 1/13338* (2013.01);
(Continued)

(58) Field of Classification Search
CPC .. G06F 3/0412; G06F 3/04182; G06F 3/0421; G06F 1/1643; G06F 21/32;
(Continued)

(56) References Cited

U.S. PATENT DOCUMENTS

2002/0163601 A1    11/2002  Min et al.
2006/0017862 A1     1/2006  Song et al.
(Continued)

FOREIGN PATENT DOCUMENTS

KR    10-2008-0083409 A    9/2008
KR       10-0873497 B1    12/2008
(Continued)

*Primary Examiner* — Temesghen Ghebretinsae
*Assistant Examiner* — Ivelisse Martinez Quiles
(74) *Attorney, Agent, or Firm* — Cha & Reiter, LLC

(57) ABSTRACT

According to various exemplary embodiments, there may be provided an electronic device including a housing having a first area facing a first direction and a second area facing a second direction, wherein the housing includes a window formed on at least one portion of the first area, a display module disposed between the window and the second area, a light converting member disposed between the window and the second area and configured to transmit light emitted from the display module in the first direction by at least partially converting a wavelength of the light reflected in the second direction by an external object of the housing, and an optical sensor disposed between the light converting member and the second area, wherein the optical sensor is configured to detect the object by using the light of which the wavelength is converted. Other various exemplary embodiments are also possible.

16 Claims, 19 Drawing Sheets

(51) Int. Cl.

| | |
|---|---|
| *G02F 1/1333* | (2006.01) |
| *G02F 1/1335* | (2006.01) |
| *G02F 1/13357* | (2006.01) |
| *G06F 1/16* | (2006.01) |
| *G06F 21/32* | (2013.01) |
| *G06K 9/00* | (2006.01) |
| *G06K 9/22* | (2006.01) |
| *H04M 1/02* | (2006.01) |
| *H04M 1/725* | (2006.01) |

(52) U.S. Cl.
CPC .. *G02F 1/133514* (2013.01); *G02F 1/133602* (2013.01); *G06F 1/1643* (2013.01); *G06F 3/0421* (2013.01); *G06F 3/04182* (2019.05); *G06F 21/32* (2013.01); *G06K 9/0002* (2013.01); *G06K 9/0004* (2013.01); *G06K 9/22* (2013.01); *H04M 1/0266* (2013.01); *H04M 1/026* (2013.01); *H04M 1/72577* (2013.01); *H04M 2250/12* (2013.01)

(58) Field of Classification Search
CPC ........... G02F 1/13338; G02F 1/133514; G02F 1/133602; G02F 1/1333; G02F 1/133553; G02F 2001/133331; G02F 2001/13356; G02F 2001/133562; G06K 9/0002; G06K 9/0004; G06K 9/22; H04M 1/026; H04M 1/72577; H04M 2250/12; H04M 1/0266
See application file for complete search history.

(56) References Cited

U.S. PATENT DOCUMENTS

| | | | |
|---|---|---|---|
| 2008/0252618 A1* | 10/2008 | Chung | G02F 1/1368 345/175 |
| 2012/0139866 A1* | 6/2012 | Jung | H01L 27/124 345/174 |
| 2012/0169962 A1* | 7/2012 | Yuki | G01J 1/02 349/61 |
| 2014/0204128 A1 | 7/2014 | Jiang | |
| 2015/0186706 A1* | 7/2015 | Pierce | G06K 9/00067 382/124 |
| 2015/0198699 A1 | 7/2015 | Kuo et al. | |
| 2016/0078274 A1* | 3/2016 | Tuneld | G06K 9/0002 382/124 |
| 2016/0132176 A1 | 5/2016 | Bae et al. | |
| 2016/0266695 A1* | 9/2016 | Bae | G06F 1/1643 |
| 2017/0123542 A1* | 5/2017 | Xie | H01L 27/3227 |

FOREIGN PATENT DOCUMENTS

| | | |
|---|---|---|
| KR | 10-2011-0095565 A | 8/2011 |
| KR | 10-2015-0131944 A | 11/2015 |

* cited by examiner

DISPLAY COMPRISING SENSING FUNCTION, AND ELECTRONIC DEVICE COMPRISING SAME

CLAIM OF PRIORITY

This application is a National Phase Entry of PCT International Application No. PCT/KR2017/002543, which was filed on Mar. 9, 2017 and claims a priority to Korean Patent Application No. 10-2016-0028271, which was filed on Mar. 9, 2016, the contents of which are incorporated herein by reference.

TECHNICAL FIELD

Various exemplary embodiments of the present invention relate to a display including a sensing function and an electronic device including the display.

BACKGROUND ART

With the development of electronic techniques, electronic devices having various functions have recently been introduced. In general, the electronic devices have a convergence function which performs one or more functions in combination.

The electronic device may include at least one sensor for detecting various surrounding environments. According to one exemplary embodiment, it is important that these sensors have an efficient mounting structure to contribute to making the electronic device slim while providing improved convenience of use.

DISCLOSURE OF INVENTION

Technical Problem

According to various exemplary embodiments, an electronic device (e.g., a portable smart phone) may include at least one sensor. According to one exemplary embodiment, the electronic device may detect an external environment via at least one sensor and perform a corresponding function according to a detected parameter. According to one exemplary embodiment, the sensor may include a fingerprint recognition sensor. According to one exemplary embodiment, the fingerprint recognition sensor may recognize a fingerprint by distinguishing a valley and ridge of the fingerprint of a finger by the use of a difference in capacitance or ultrasonic waves reflected from the finger.

However, the conventional fingerprint recognition technology is inconvenient to use since it is applied to a specific area (e.g., a home button or a designated area of an electronic device recognized by the user) of the electronic device, and may operate erroneously when a fingerprint recognition area is contaminated.

According to various exemplary embodiments, there may be provided a display including a sensing function and an electronic device including the display.

According to various exemplary embodiments, there may be provided a display including a sensing function capable of contributing to making an electronic device slim by excluding a separate installation space, and the electronic device including the display.

Solution to Problem

According to various exemplary embodiments, there may be provided an electronic device including a housing having a first area facing a first direction and a second area facing a second direction, wherein the housing includes a window formed on at least one portion of the first area, a display module disposed between the window and the second area, a light converting member disposed between the window and the second area and configured to transmit light emitted from the display module in the first direction by at least partially converting a wavelength of the light reflected in the second direction by an external object of the housing, and an optical sensor disposed between the light converting member and the second area, wherein the optical sensor is configured to detect the object by using the light of which the wavelength is converted.

Advantageous Effects of Invention

According to various exemplary embodiments, since a sensing function is performed in a display area, a space for a separate sensor can be eliminated, thereby making an electronic device slim, improving convenience of use, and providing an extended user experience.

BEST MODE FOR CARRYING OUT THE INVENTION

Figure 1:
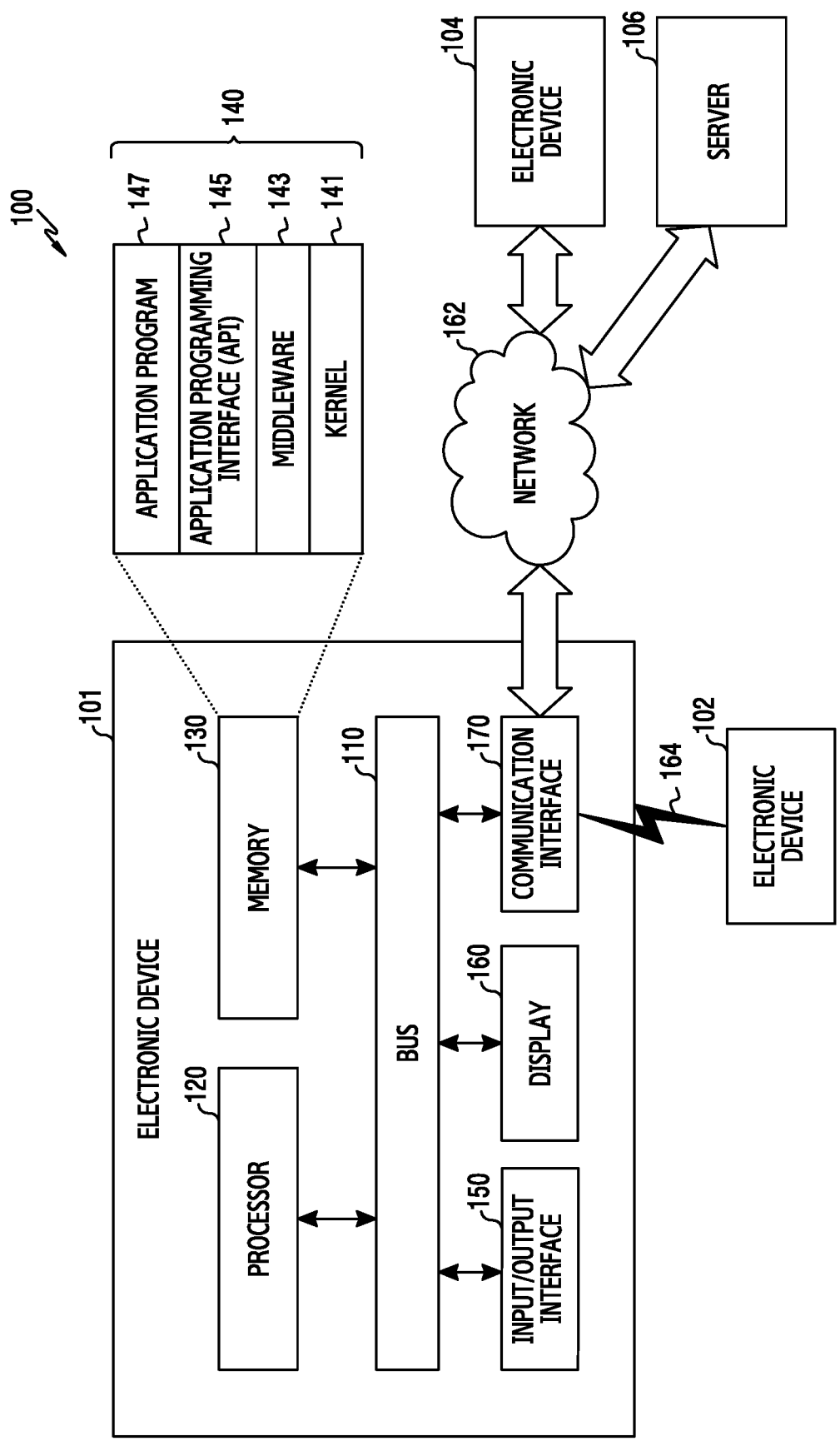
FIG. 1 illustrates a network environment including an electronic device according to various exemplary embodiments of the present invention.

Hereinafter, various exemplary embodiments of the present document are described with reference to the accompanying drawings. It should be understood, however, that it is not intended to limit the exemplary embodiments of the present document to the particular form disclosed, but, on the contrary, it is intended to cover all modifications, equivalents, and alternatives falling within the spirit and scope of the exemplary embodiments of the present document. Like reference numerals denote like constitutional elements throughout the drawings.

An expression "have", "may have", "include" or "may include" or the like used in the present document is intended to indicate a presence of a corresponding characteristic (e.g., a number, a function, an operation, or a constitutional element such as a component), and should be understood that there are additional possibilities of one or more other characteristics.

In the present document, an expression "A or B", "A and/or B", or "one or more of A and/or B" or the like may include all possible combinations of items enumerated together. For example, "A or B", "at least one of A and B", or "at least one of A or B" may indicate all cases where: (1) at least one A is included; (2) at least one B is included; and (3) at least one A and at least one B are both included.

Although expressions such as "$1^{st}$", "$2^{nd}$", "first", and "second" may be used in the present document to express various constitutional elements, it is not intended to limit the corresponding constitutional elements. For example, the above expressions may be used to distinguish one constitutional element from another constitutional element. For example, a $1^{st}$ user device and a $2^{nd}$ user device are both user devices, and indicate different user devices. For example, a $1^{st}$ constitutional element may be termed a $2^{nd}$ constitutional element, and similarly, the $2^{nd}$ constitutional element may be termed the $1^{st}$ constitutional element without departing from the scope of the present document.

When a certain constitutional element (e.g., the $1^{st}$ constitutional element) is mentioned as being "operatively or communicatively coupled with/to" or "connected to" a different constitutional element (e.g., the $2^{nd}$ constitutional element), it is to be understood that the certain constitutional element is directly coupled with/to another constitutional element or can be coupled with/to the different constitutional element via another constitutional element (e.g., a $3^{rd}$ constitutional element). On the other hand, when the certain constitutional element (e.g., the $1^{st}$ constitutional element) is mentioned as being "directly coupled with/to" or "directly connected to" the different constitutional element (e.g., the $2^{nd}$ constitutional element), it may be understood that another constitutional element (e.g., the $3^{rd}$ constitutional element) is not present between the certain constitutional element and the different constitutional element.

An expression "configured to" used in the present document may be interchangeably used with, for example, "suitable for", "having the capacity to", "designed to", "adapted to", "made to", or "capable of" according to a situation. A term "configured to" may not imply only "specially designed to" in a hardware manner. Instead, in a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an Application Processor (AP)) capable of performing corresponding operations by executing one or more software programs stored in a memory device.

Terms used in the present document are for the purpose of describing particular embodiments only and are not intended to limit other exemplary embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the present document. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the present document should not be interpreted to exclude the exemplary embodiments of the present document.

An electronic device according to various exemplary embodiments of the present document may include, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device. According to various exemplary embodiments, the wearable device may include at least one of an accessory-type device (e.g., a watch, a ring, a bracelet, an anklet, a necklace, glasses, contact lenses, or a Head-Mounted Device (HMD)), a fabric- or clothes-integrated device (e.g., electronic clothes), a body attaching-type device (e.g., a skin pad or tattoo), or a body implantable device (e.g., an implantable circuit).

According to certain exemplary embodiments, the electronic device may be a home appliance. The home appliance may include, for example, at least one of a TeleVision (TV), a Digital Video Disk (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, and an electronic picture frame.

According to other exemplary embodiments, the electronic device may include at least one of various medical devices (e.g., various portable medical measuring devices (e.g., a blood sugar measuring device, a hear rate measuring device, a blood pressure measuring device, a body temperature measuring device, etc.), Magnetic Resonance Angiography (MRA), Magnetic Resonance Imaging (MRI), Computed Tomography (CT), imaging equipment, ultrasonic instrument, etc.)), a navigation device, a Global Navigation Satellite System (GNSS), an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, an Automatic Teller's Machine (ATM) of financial institutions, Point Of Sales (POS) of shops, and Internet of things (e.g., a light bulb, various sensors, an electric or gas meter, a sprinkler device, a fire alarm, a thermostat, a streetlamp, a toaster, a fitness equipment, a hot water tank, a heater, a boiler, etc.).

According to certain exemplary embodiments, the electronic device may include at least one of furniture or a part of buildings/constructions, an electronic board, an electronic signature input device, a projector, and various measurement machines (e.g., water supply, electricity, gas, propagation measurement machine, etc.). In various exemplary embodiments, the electronic device may be one or more combinations of the aforementioned various devices. According to certain exemplary embodiments, the electronic device may be a flexible device. Further, the electronic device according to an exemplary embodiment of the present document is not limited to the aforementioned devices, and may include a new electronic device depending on technical progress.

Hereinafter, an electronic device according to various exemplary embodiments will be described with reference to the accompanying drawings. The term "user" used in the present document may refer to a person who uses the electronic device or a device which uses the electronic device (e.g., an Artificial Intelligence (AI) electronic device).

FIG. 1 illustrates a network environment including an electronic device according to various exemplary embodiments.

Referring to FIG. 1, an electronic device 101 in a network environment 100 is disclosed according to various exemplary embodiments. The electronic device 101 may include a bus 110, a processor 120, a memory 130, an input/output interface 150, a display 160, and a communication interface 170. In a certain exemplary embodiment, the electronic device 101 may omit at least one of the aforementioned constitutional elements or may additionally include other constitutional elements.

The bus 110 may include a circuit for connecting the aforementioned constitutional elements 120 to 170 to each other and for delivering communication (e.g., a control message and/or data) between the aforementioned constitutional elements.

The processor 120 may include one or more of a Central Processing Unit (CPU), an Application Processor (AP), and a Communication Processor (CP). The processor 120 may control, for example, at least one of other constitutional elements of the electronic device 101 and/or may execute an arithmetic operation or data processing for communication.

The memory 130 may include a volatile and/or nonvolatile memory. The memory 130 may store, for example, an instruction or data related to at least one different constitutional element of the electronic device 101. According to various exemplary embodiments, the memory 130 may store a software and/or a program 140. The program 140 may include, for example, a kernel 141, a middleware 143, an Application Programming Interface (API) 145, and/or an application program (or an "application") 147, or the like. At least one part of the kernel 141, middleware 143, or API 145 may be referred to as an Operating System (OS).

The kernel 141 may control or manage, for example, system resources (e.g., the bus 110, the processor 120, the memory 130, etc.) used to execute an operation or function implemented in other programs (e.g., the middleware 143, the API 145, or the application program 147). Further, the kernel 141 may provide an interface capable of controlling or managing the system resources by accessing individual constitutional elements of the electronic device 101 in the middleware 143, the API 145, or the application program 147.

The middleware 143 may perform, for example, a mediation role so that the API 145 or the application program 147 can communicate with the kernel 141 to exchange data.

Further, the middleware 143 may handle one or more task requests received from the application program 147 according to a priority. For example, the middleware 143 may assign a priority of using the system resources (e.g., the bus 110, the processor 120, or the memory 130) of the electronic device 101 to at least one of the application programs 147. For instance, the middleware 143 may process the one or more task requests according to the priority assigned to the at least one of the application programs, and thus may perform scheduling or load balancing on the one or more task requests.

The API 145 may include at least one interface or function (e.g., instruction), for example, for file control, window control, video processing, or character control, as an interface capable of controlling a function provided by the application 147 in the kernel 141 or the middleware 143.

For example, the input/output interface 150 may play a role of an interface for delivering an instruction or data input from a user or a different external device(s) to the different constitutional elements of the electronic device 101. Further, the input/output interface 150 may output an instruction or data received from the different constitutional element(s) of the electronic device 101 to the different external device.

The display 160 may include various types of displays, for example, a Liquid Crystal Display (LCD) display, a Light Emitting Diode (LED) display, an Organic Light-Emitting Diode (OLED) display, a MicroElectroMechanical Systems (MEMS) display, or an electronic paper display. The display 160 may display, for example, a variety of contents (e.g., text, image, video, icon, symbol, etc.) to the user. The display 160 may include a touch screen. For example, the display 160 may receive a touch, gesture, proximity, or hovering input by using a stylus pen or a part of a user's body.

The communication interface 170 may establish, for example, communication between the electronic device 101 and the external device (e.g., a $1^{st}$ external electronic device 102, a $2^{nd}$ external electronic device 104, or a server 106). For example, the communication interface 170 may communicate with the external device (e.g., the $2^{nd}$ external electronic device 104 or the server 106) by being connected to a network 162 through wireless communication or wired communication.

For example, as a cellular communication protocol, the wireless communication may use at least one of Long-Term Evolution (LTE), LTE Advance (LTE-A), Code Division Multiple Access (CDMA), Wideband CDMA (WCDMA), Universal Mobile Telecommunications System (UMTS), Wireless Broadband (WiBro), Global System for Mobile Communications (GSM), and the like. Further, the wireless communication may include, for example, a near-distance communication 164. The near-distance communication 164 may include, for example, at least one of Wireless Fidelity (WiFi), Bluetooth, Near Field Communication (NFC), Global Navigation Satellite System (GNSS), and the like. According to a usage region or a bandwidth or the like, the GNSS may include, for example, at least one of Global Positioning System (GPS), Global Navigation Satellite System (Glonass), Beidou Navigation Satellite System (hereinafter, "Beidou"), Galileo, the European global satellite-based navigation system, and the like. Hereinafter, the "GPS" and the "GNSS" may be used interchangeably in the present document. The wired communication may include, for example, at least one of Universal Serial Bus (USB), High Definition Multimedia Interface (HDMI), Recommended Standard-232 (RS-232), power-line communication, Plain Old Telephone Service (POTS), and the like. The network 162 may include, for example, at least one of a telecommunications network, a computer network (e.g., LAN or WAN), the Internet, and a telephone network.

Each of the $1^{st}$ and $2^{nd}$ external electronic devices 102 and 104 may be the same type or different type of the electronic device 101. According to one exemplary embodiment, the server 106 may include a group of one or more servers.

According to various exemplary embodiments, all or some of operations executed by the electronic device 101 may be executed in a different one or a plurality of electronic devices (e.g., the electronic device 102 or 104 or the server 106). According to one exemplary embodiment, if the electronic device 101 needs to perform a certain function or service either automatically or at a request, the electronic device 101 may request at least some parts of functions related thereto alternatively or additionally to a different electronic device (e.g., the electronic device 102 or 104 or the server 106) instead of executing the function or the service autonomously. The different electronic device (e.g., the electronic device 102 or 104 or the server 106) may execute the requested function or additional function, and may deliver a result thereof to the electronic device 101. The electronic device 101 may provide the requested function or service either directly or by additionally processing the received result. For this, for example, a cloud computing, distributed computing, or client-server computing technique may be used.

Figure 2:
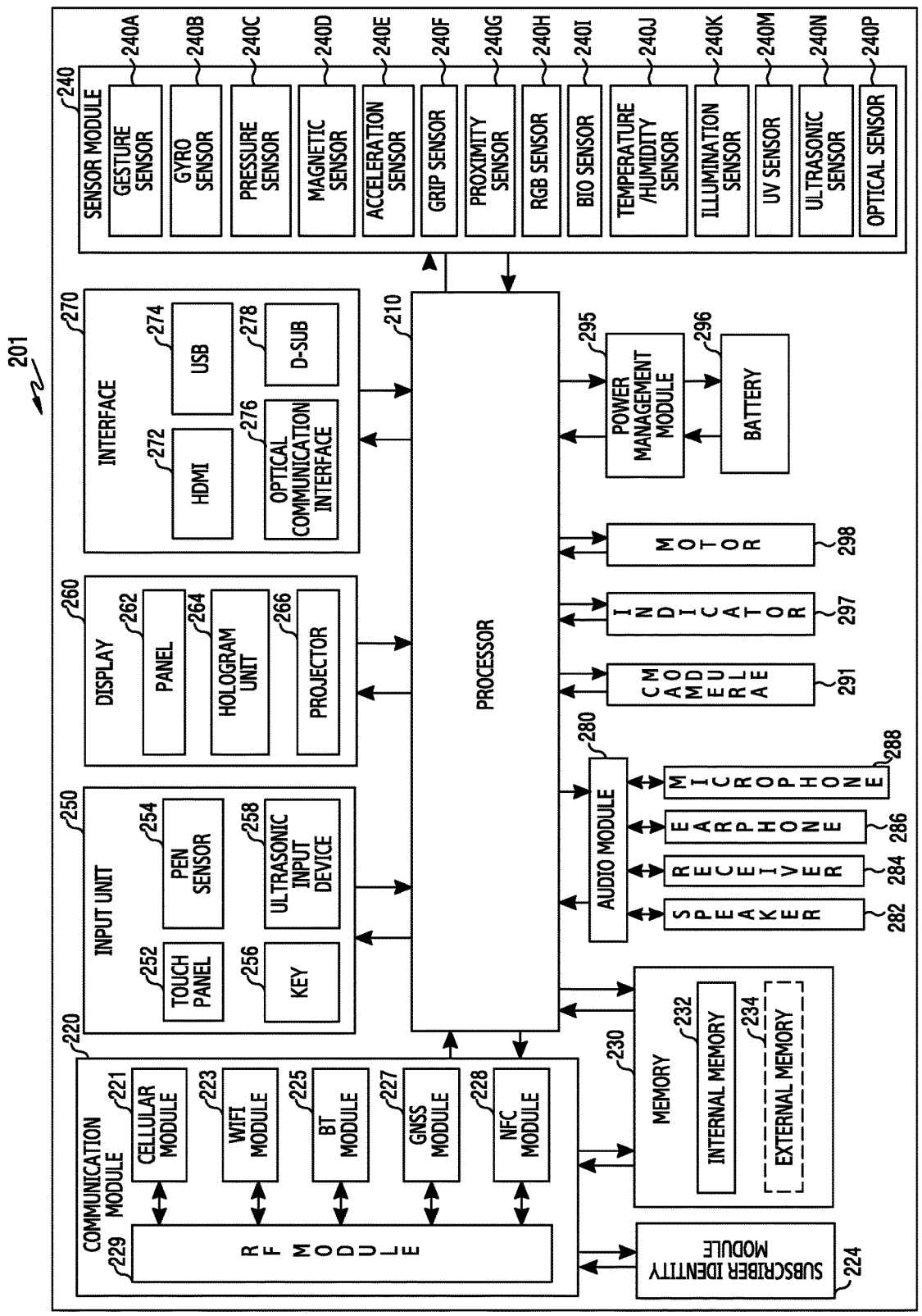
FIG. 2 is a block diagram of an electronic device according to various exemplary embodiments of the present invention.

FIG. 2 is a block diagram of an electronic device according to various exemplary embodiments.

An electronic device 201 may include, for example, all or some parts of the electronic device 101 of FIG. 1. The electronic device 201 may include one or more processors (e.g., Application Processors (APs)) 210, a communication module 220, a subscriber identity module 224, a memory 230, a sensor module 240, an input unit 250, a display 260, an interface 270, an audio module 280, a camera unit 291, a power management module 295, a battery 296, an indicator 297, and a motor 298.

The processor 210 may control a plurality of hardware or software constitutional elements connected to the processor 210 by driving, for example, an operating system or an application program, and may process a variety of data including multimedia data and may perform an arithmetic operation. The processor 210 may be implemented, for example, with a System on Chip (SoC). According to one exemplary embodiment, the processor 210 may further include a Graphic Processing Unit (GPU) and/or an Image Signal Processor (ISP). The processor 210 may include at least one part (e.g., a cellular module 221) of the aforementioned constitutional elements of FIG. 2. The processor 210 may process an instruction or data, which is received from at least one of different constitutional elements (e.g., a non-volatile memory), by loading it to a volatile memory and may store a variety of data in the non-volatile memory.

The communication module 220 may have a structure the same as or similar to the communication interface 170 of FIG. 1. The communication module 220 may include, for example, the cellular module 221, a Wi-Fi module 223, a BlueTooth (BT) module 225, a GNSS module 227 (e.g., a GPS module, a Glonass module, a Beidou module, or a Galileo module), a Near Field Communication (NFC) module 228, and a Radio Frequency (RF) module 229.

The cellular module 221 may provide a voice call, a video call, a text service, an Internet service, or the like, for example, through a communication network. According to one exemplary embodiment, the cellular module 221 may identify and authenticate the electronic device 201 in the communication network by using the subscriber identity module (e.g., a Subscriber Identity Module (SIM) card) 224. According to one exemplary embodiment, the cellular module 221 may perform at least some functions that can be provided by the processor 210. According to one exemplary embodiment, the cellular module 221 may include a Communication Processor (CP).

Each of the WiFi module 223, the BT module 225, the GNSS module 227, or the NFC module 228 may include, for example, a processor for processing data transmitted/received via a corresponding module. According to a certain exemplary embodiment, at least some (e.g., two or more) of the cellular module 221, the WiFi module 223, the BT module 225, the GPS module 227, and the NFC module 228 may be included in one Integrated Chip (IC) or IC package.

The RF module 229 may transmit/receive, for example, a communication signal (e.g., a Radio Frequency (RF) signal). The RF module 229 may include, for example, a transceiver, a Power Amp Module (PAM), a frequency filter, a Low Noise Amplifier (LNA), an antenna, or the like. According to another exemplary embodiment, at least one of the cellular module 221, the WiFi module 223, the BT module 225, the GPS module 227, and the NFC module 228 may transmit/receive an RF signal via a separate RF module.

The subscriber identity module 224 may include, for example, a card including the subscriber identity module and/or an embedded SIM, and may include unique identification information (e.g., an Integrated Circuit Card IDentifier (ICCID)) or subscriber information (e.g., an International Mobile Subscriber Identity (IMSI)).

The memory 230 (e.g., the memory 130) may include, for example, an internal memory 232 or an external memory 234. The internal memory 232 may include, for example, at least one of a volatile memory (e.g., a Dynamic RAM (DRAM), a Static RAM (SRAM), a Synchronous Dynamic RAM (SDRAM), etc.) and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard drive, or a Solid State Drive (SSD)).

The external memory 234 may further include a flash drive, for example, Compact Flash (CF), Secure Digital (SD), Micro Secure Digital (Micro-SD), Mini Secure digital (Mini-SD), extreme Digital (xD), memory stick, or the like. The external memory 234 may be operatively and/or physically connected to the electronic device 201 via various interfaces.

The sensor module 240 may measure, for example, physical quantity or detect an operational status of the electronic device 201, and may convert the measured or detected information into an electric signal. The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, an Ultra Violet (UV) sensor 240M, an ultrasonic sensor 240N, and an optical sensor 240P. According to one exemplary embodiment, the optical sensor 240P may detect light which is introduced basically according to exemplary embodiments of the present invention or reflected by an external object (e.g., a user's finger. etc.), and which is converted into a specific wavelength band by means of a light converting member.

Additionally or alternatively, the sensor module 240 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, and/or a fingerprint sensor. The sensor module 240 may further include a control circuit for controlling at least one or more sensors included therein. In a certain exemplary embodiment, the electronic device 201 may further include a processor configured to control the sensor module 204 either separately or as one part of the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may recognize a touch input, for example, by using at least one of an electrostatic type, a pressure-sensitive type, and an ultrasonic type. In addition, the touch panel 252 may further include a control circuit. The touch penal 252 may further include a tactile layer and thus may provide the user with a tactile reaction.

The (digital) pen sensor 254 may be, for example, one part of a touch panel, or may include an additional sheet for recognition. The key 256 may be, for example, a physical button, an optical key, a keypad, or a touch key. The ultrasonic input device 258 may detect an ultrasonic wave generated from an input means through a microphone (e.g., a microphone 288) to confirm data corresponding to the detected ultrasonic wave.

The display 260 (e.g., the display 160) may include a panel 262, a hologram unit 264, or a projector 266. The panel 262 may include a structure the same as or similar to the display 160 of FIG. 1. The panel 262 may be implemented, for example, in a flexible, transparent, or wearable manner. The panel 262 may be constructed as one module with the touch panel 252. According to one exemplary embodiment, the panel 262 may include a pressure sensor (or a force sensor) capable of measuring strength of pressure for a user's touch. The pressure sensor may be implemented in an integral form with respect to the touch panel 252, or may be implemented as one or more sensors separated from the touch panel 252. The hologram unit 264 may use an interference of light and show a stereoscopic image in the air. The projector 266 may display an image by projecting a light beam onto a screen. The screen may be located, for example, inside or outside the electronic device 201. According to one exemplary embodiment, the display 260 may further include a control circuit for controlling the panel 262, the hologram unit 264, or the projector 266.

The interface 270 may include, for example, a High-Definition Multimedia Interface (HDMI) 272, a Universal Serial Bus (USB) 274, an optical communication interface 276, or a D-subminiature (D-sub) 278. The interface 270 may be included, for example, in the communication interface 170 of FIG. 1. Additionally or alternatively, the interface 270 may include, for example, a Mobile High-definition Link (MHL) interface, a Secure Digital (SD)/MultiMedia Card (MMC) interface, or an Infrared Data Association (IrDA) standard interface.

The audio module 280 may bilaterally convert, for example, a sound and electric signal. At least some constitutional elements of the audio module 280 may be included in, for example, the input/output interface 150 of FIG. 1. The audio module 280 may convert sound information which is input or output, for example, through a speaker 282, a receiver 284, an earphone 286, the microphone 288, or the like.

The camera module 291 is, for example, a device for image and video capturing, and according to one exemplary embodiment, may include one or more image sensors (e.g., a front sensor or a rear sensor), a lens, an Image Signal Processor (ISP), or a flash (e.g., LED or xenon lamp).

The power management module 295 may manage, for example, power of the electronic device 201. According to one exemplary embodiment, the power management module 295 may include a Power Management Integrated Circuit (PMIC), a charger Integrated Circuit (IC), or a battery fuel gauge. The PMIC may have a wired and/or wireless charging type. The wireless charging type may include, for example, a magnetic resonance type, a magnetic induction type, an electromagnetic type, or the like, and may further include an additional circuit for wireless charging, for example, a coil loop, a resonant circuit, a rectifier, or the like. The battery gauge may measure, for example, residual quantity of the battery 296 and voltage, current, and temperature during charging. The battery 296 may include, for example, a rechargeable battery and/or a solar battery.

The indicator 297 may display a specific state, for example, a booting state, a message state, a charging state, or the like, of the electronic device 201 or one part thereof (e.g., the processor 210). The motor 298 may convert an electric signal into a mechanical vibration, and may generate a vibration or haptic effect. Although not shown, the electronic device 201 may include a processing device (e.g., a GPU) for supporting a mobile TV. The processing device for supporting the mobile TV may process media data conforming to a protocol of, for example, Digital Multimedia Broadcasting (DMB), Digital Video Broadcasting (DVB), Media-Flo™, or the like.

Each of constitutional elements described in the present document may consist of one or more components, and names thereof may vary depending on a type of an electronic device. The electronic device according to various exemplary embodiments may include at least one of the constitutional elements described in the present document. Some of the constitutional elements may be omitted, or additional other constitutional elements may be further included. Further, some of the constitutional elements of the electronic device according to various exemplary embodiments may be combined and constructed as one entity, so as to equally perform functions of corresponding constitutional elements before combination.

Figure 3A:
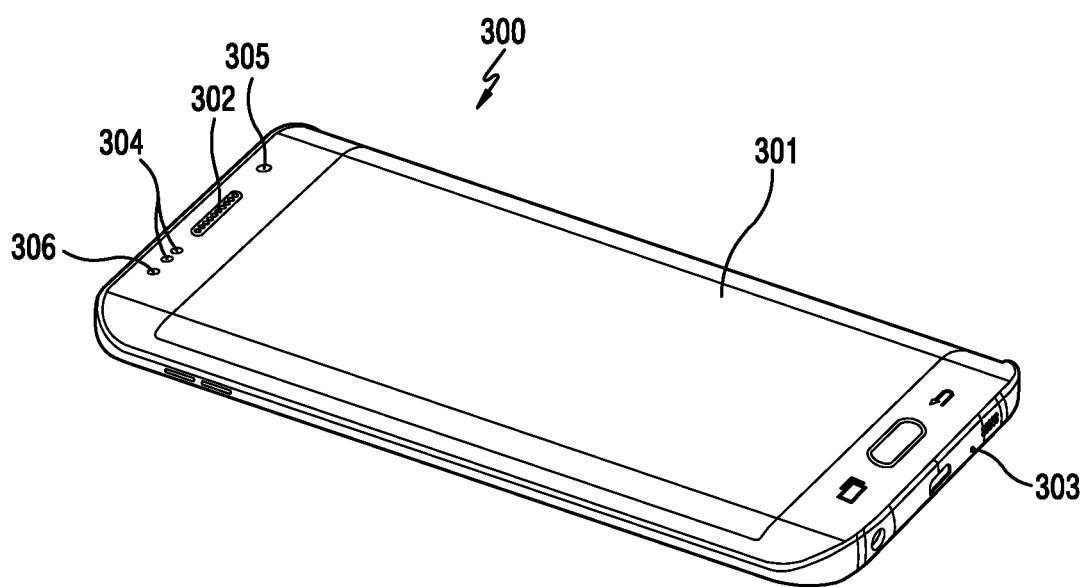
FIG. 3A is a perspective view of an electronic device according to various exemplary embodiments of the present invention.
Figure 3B:
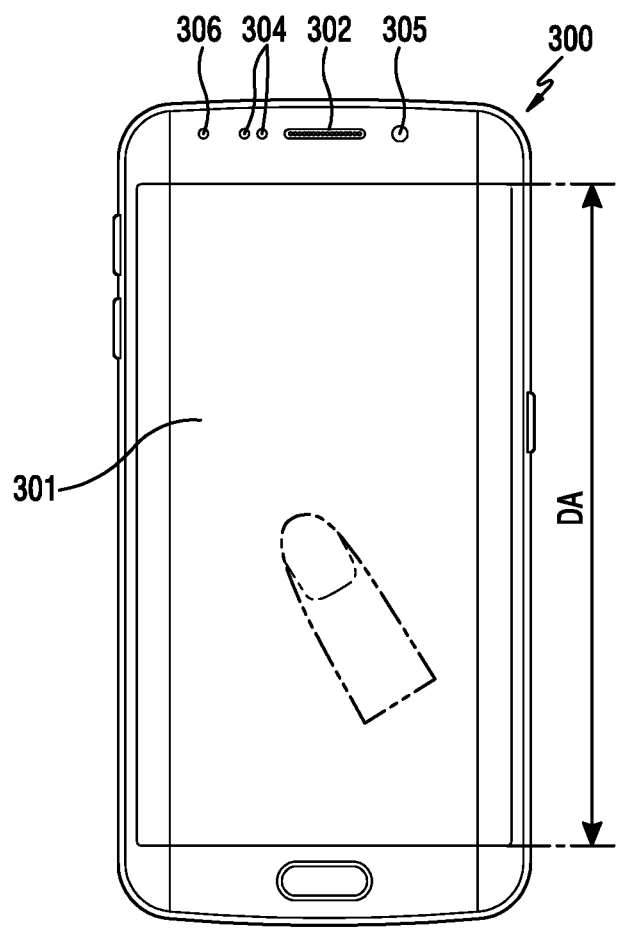
FIG. 3B is a plan view of an electronic device according to various exemplary embodiments of the present invention.

FIG. 3A is a perspective view of an electronic device 300 according to various exemplary embodiments of the present invention. FIG. 3B is a plan view of the electronic device 300 according to various exemplary embodiments of the present invention.

Referring to FIG. 3A and FIG. 3B, the electronic device 300 may have a display 301 disposed on a front side thereof. According to one exemplary embodiment, the display 301 may include a touch display including a touch sensor (a contact type sensor or a non-contact type touch sensor (digitizer)). According to one exemplary embodiment, the display 301 may include a force sensor to detect external force that is applied to a surface of the display 301. According to one exemplary embodiment, the electronic device 300 may perform a corresponding function based on the external force detected in the display 301. According to one exemplary embodiment, a speaker device 302 for outputting voice of a peer user may be disposed to one side of the display 301. According to one exemplary embodiment, a microphone device 303 may be disposed to the other side of the display 310 to transmit user's voice to the peer user.

According to various exemplary embodiments, components for performing various functions of the electronic device 300 may be disposed around a portion in which the speaker device 302 is installed. The components may include at least one sensor module 304. The sensor module 304 may include, for example, at least one of an illumination sensor (e.g., an optical sensor), a proximity sensor (e.g., an optical sensor), an infrared sensor, and an ultrasonic sensor.

According to one exemplary embodiment, the component may include a front camera device 305. According to one exemplary embodiment, the component may include an indicator 306 for informing the user of status information of the electronic device.

According to various exemplary embodiments, the display 301 may also be used for data output, and may also be used as a detection member for detecting an external environment. According to one exemplary embodiment, the display 301 may be used as a fingerprint recognition sensor for recognizing a user's fingerprint. In this case, the entire area of the display 301 (a DA area of FIG. 3B) may be utilized as an area for fingerprint recognition. Therefore, when the display is used for a fingerprint recognition function, the fingerprint may be recognized regardless of any area touched by the user in the display area (the DA area).

According to various exemplary embodiments, the display may have a substantially flat shape. However, the present invention is not limited thereto, and thus a shape in which at least one portion of the display is curved may also be included.

According to various exemplary embodiments, the electronic device may have various shapes including the display. According to one exemplary embodiment, the electronic device may include not only a bar type but also a folder type, a slide type, a swible type, a wrap around type, an infinite screen, an infinite screen type, or a dual display type.

According to various exemplary embodiments, the display 301 may be used as a touch sensor. According to one exemplary embodiment, a more sensitive touch may be possible by an optical sensor disposed for each pixel of the display 301 in comparison with a touch sensor based on the conventional electrode arrangement type. According to one exemplary embodiment, the display 301 may be utilized as an illumination sensor by calculating an amount of light received from the outside. According to one exemplary embodiment, the display 301 may be utilized as a proximity sensor for detecting an approach of an external object. According to one exemplary embodiment, the display 301 may be utilized as a heart rate sensor for measuring a blood flow of a human body in contact with the display.

According to various exemplary embodiments, the electronic device 300 uses at least one of the sensors described above as the display 301, thereby excluding a sensor separately provided to perform a corresponding function, improving convenience of use, and contributing to making the electronic device slim.

Figure 4:
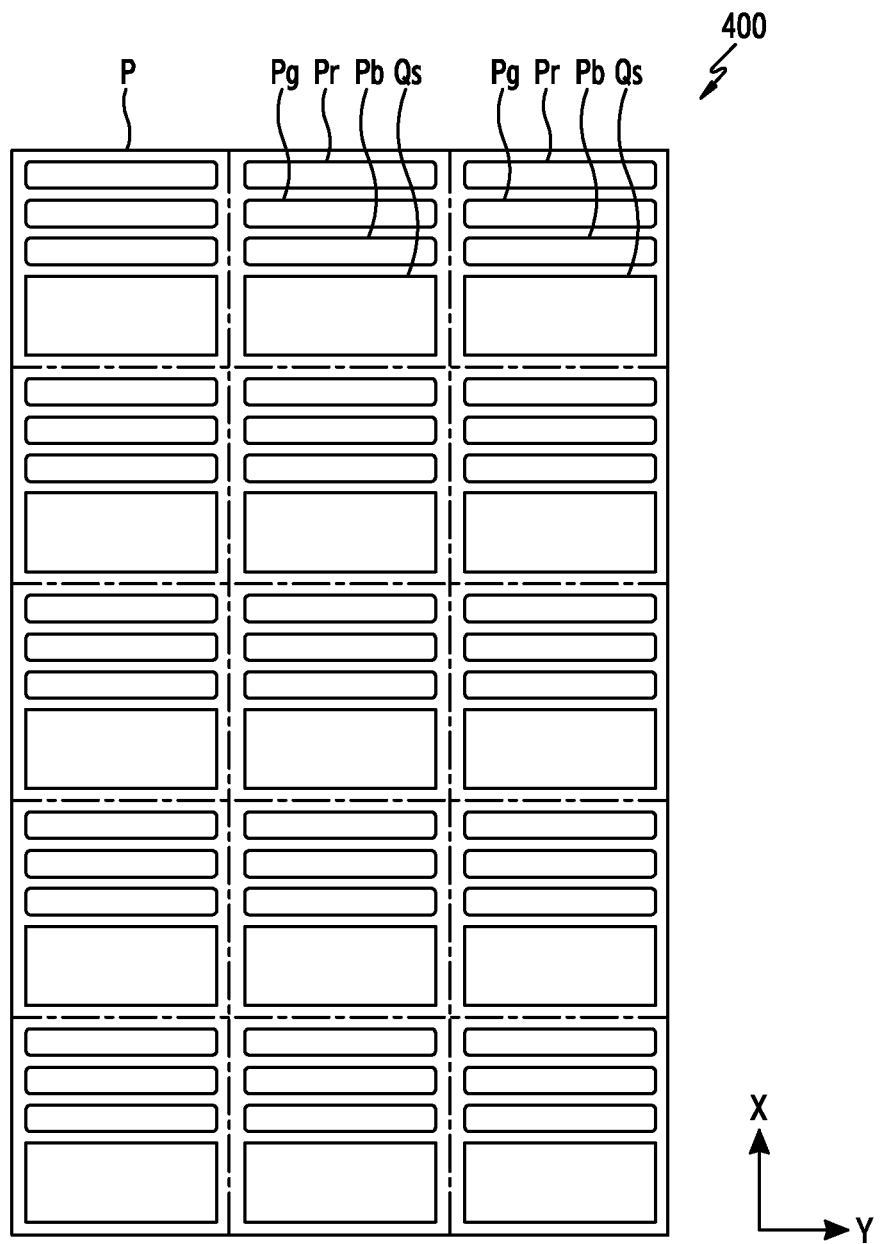
FIG. 4 is a schematic view illustrating a structure of a display according to various exemplary embodiments of the present invention.
Figure 5:
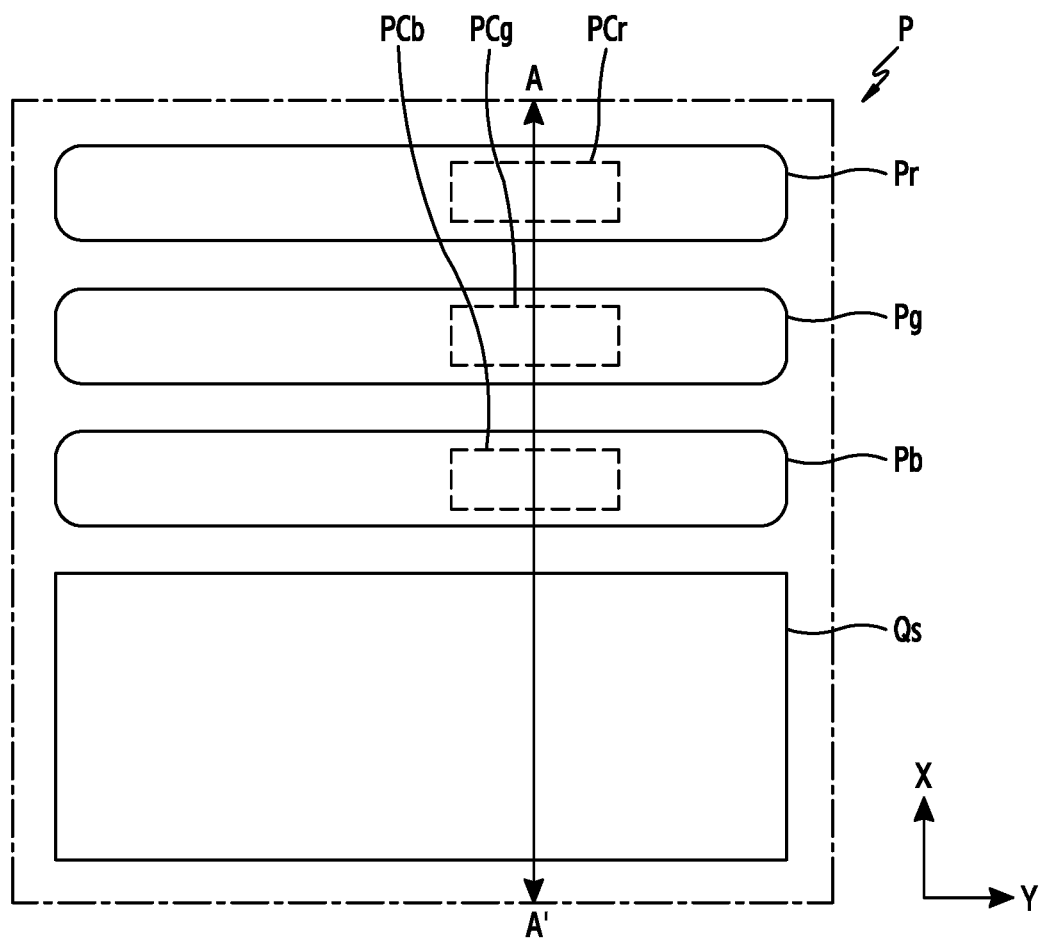
FIG. 5 is a schematic view illustrating a structure of one pixel of a display according to various exemplary embodiments of the present invention.

FIG. 4 is a schematic view illustrating a structure of a display according to various exemplary embodiments of the present invention. FIG. 5 is a schematic view illustrating a structure of one pixel of a display according to various exemplary embodiments of the present invention.

Although it is described that a light receiving module area Qs according to exemplary embodiments of the present invention is disposed to a display including a plurality of pixels disposed in an RGB manner, the present invention is not limited thereto. For example, the light receiving module area Qs according to the exemplary embodiments of the present invention may also be disposed to a display including a plurality of pixels disposed in a pen-tile RGBG or pen-tile RGBW (e.g., WOLED) manner.

A display 400 of FIG. 4 may be another example of a display similar to or different from the display 301 of FIG. 3A and FIG. 3B.

Referring to FIG. 4 and FIG. 5, the display 400 may include a plurality of pixels. Each of pixels P included in the plurality of pixels may include areas disposed sequentially along a first direction X, that is, a first sub-pixel area Pr for emitting light of a first color, a second sub-pixel area Pg for emitting light of a second color different from the first color, a third sub-pixel area Pb for emitting light of a third color different from the first color and the second color, and a light receiving module area Qs for receiving external light.

According to various exemplary embodiments, the plurality of pixels P may be arranged in a matrix form on a substrate (e.g., 610 of FIG. 6), and a specific number of the pixels may be disposed along the first direction X and a second direction Y on the basis of a resolution. The first direction X may be a long-side direction of the display 301 of FIG. 3A and FIG. 3B, and the second direction Y may be substantially perpendicular to the first direction X and may be a short-side direction of the display 301 of FIG. 3A and FIG. 3B. According to one exemplary embodiment, the first sub-pixel area Pr included in the plurality of pixels P disposed along the first direction X may be disposed to be adjacent to each other along the second direction Y According to one exemplary embodiment, the second sub-pixel area Pg, the third sub-pixel area Pb, and the light receiving module area Qs may be disposed to be adjacent to each other along the second direction Y According to one exemplary embodiment, the light receiving module area Qs included in each pixel P may be disposed to be adjacent to the first sub-pixel area Pr of another pixel P disposed to be adjacent in the first direction X.

According to various exemplary embodiments, each of the first to third sub-pixel areas Pr, Pg, and Pb may emit light of different colors, i.e., the first color to the third color, and each of the first color to the third color may be, for example, red (R), green (G), and blue (B). However, the present invention is not limited thereto, and thus any combination may be possible as long as white light can be realized by combining the first color to the third color. According to one exemplary embodiment, the first to third sub-pixel areas Pr, Pg, and Pb may respectively include a first circuit portion PCr, a second circuit portion PCg, and a third circuit portion PCb, and the first to third circuit portions PCr, PCg, and PCb may be disposed in an area overlaid with first to third pixel electrodes (e.g., 630*a*, 630*b*, and 630*c* of FIG. 6) respectively in a planar manner.

According to various exemplary embodiments, the light receiving module area Qs is provided with a light converting member (e.g., 604 of FIG. 6) for converting light which is introduced from the outside or reflected by an external object (e.g., a finger, etc.) in proximity to the display and an optical sensor (e.g., 603 in FIG. 6) which detects an amount of light of a specific wavelength band converted through the light converting member. According to one exemplary embodiment, for example, the optical sensor may perform a fingerprint recognition function by detecting a different amount of light reflected on the basis of a fingerprint formed on a user's finger and a valley between ridges of the fingerprint.

According to various exemplary embodiments, the light converting member may include a quantum dot material. According to one exemplary embodiment, a quantum dot is particles in which hundreds to thousands of atoms are gathered, and may be a semiconductor crystal in which a quantum is synthesized in unit of nanometers (nm). For example, when external light is passed through the quantum dot, various colors may be expressed depending on a particle size even if the particles have the same component. According to one exemplary embodiment, the quantum dot semiconductor crystal may utilize elements in which such a characteristic is strong, and the elements may include InSe, CdSe, InP, InSE, ZnO, CdSe/ZnS, ZnSe/ZnS, ZnSe, InAs/GaAs, PbS, EuS, CdS, PbSe/CdSe, $CdTe_xSe_x/Cd_xZn_xS$, or the like. According to one exemplary embodiment, a size of the quantum dot crystals may be formed in the range of 1 nm to 20 nm.

According to various exemplary embodiments, the light converting member may pass light of a wavelength band (e.g., infrared light having a wavelength of at least 750 nm) which satisfies a specific condition of incident light. According to one exemplary embodiment, the optical sensor may include an InfraRed (IR) sensor for detecting such infrared light. However, the present invention is not limited thereto, and thus the light converting member may pass the light by converting into light having a wavelength of various desired bands according to a crystal structure of the quantum dot. Therefore, the optical sensor may also be configured with a corresponding optical sensor for detecting only the light of this specific wavelength band.

According to various exemplary embodiments, the first to third sub-pixel areas Pr, Pg, and Pb may be disposed in various forms in which there are adjacent to each other instead of a matrix form, and the light receiving module area Qs may be disposed in various Black Matrix (BM) areas in which the first to third sub-pixel areas Pr, Pg, and Pb are not disposed in one pixel area P.

Figure 6:
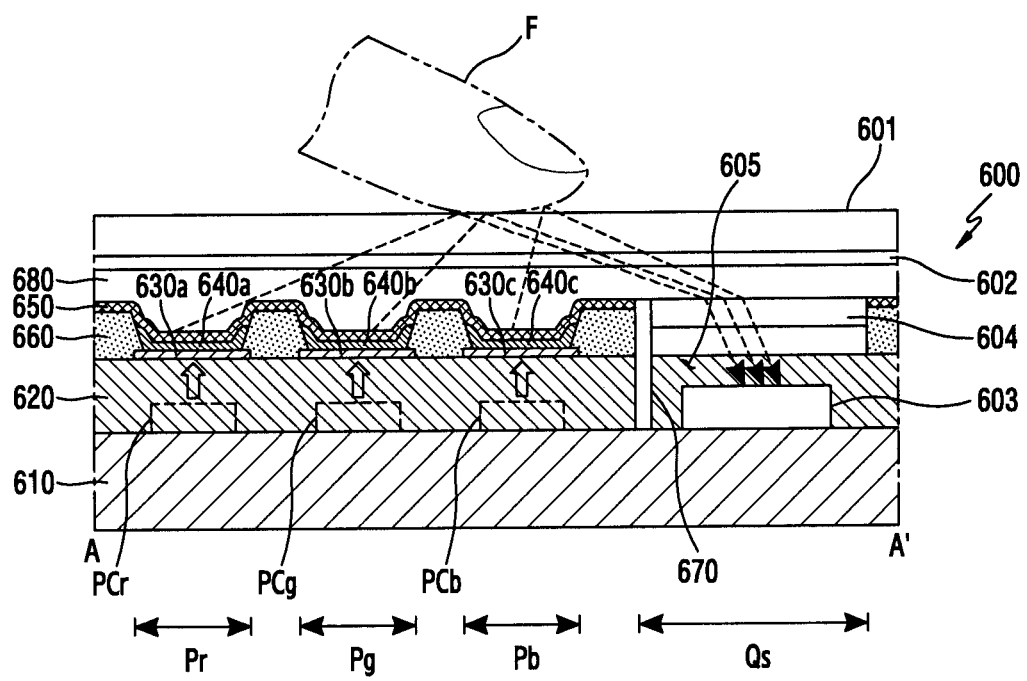
FIG. 6 is a cross-sectional view illustrating an important part of a display, cut along the line A-A' of FIG. 5, according to various exemplary embodiments of the present invention.

FIG. 6 is a cross-sectional view illustrating an important part of a display 600, cut along the line A-A' of FIG. 5, according to various exemplary embodiments of the present invention.

The display 600 of FIG. 6 may be similar to the display 301 of FIG. 3A and FIG. 3B and/or the display 400 of FIG. 4, or may be another example of the display.

Referring to FIG. 6, the display 600 may include a substrate 610 in which a first sub-pixel area Pr, a second sub-pixel area Pg, a third sub-pixel area Pb, and a light receiving module area Qs are divided as one pixel. According to one exemplary embodiment, a first pixel electrode 630a, a second pixel electrode 630b, and a third pixel electrode 630c may be disposed respectively to the first sub-pixel area Pr, the second sub-pixel area Pg, and the third sub-pixel area Pb on the substrate 610. According to one exemplary embodiment, a first intermediate layer 640a, a second intermediate layer 640b, and a third intermediate layer 640c may be disposed respectively on the first to third pixel electrodes 630a, 630b, and 630c.

According to various exemplary embodiments, the first to third sub-pixel areas Pr, Pg, and Pb are divided by a pixel define layer 660 including openings for exposing center portions of the first to third pixel electrodes 630a, 630b, and 630c, and a counter electrode 650 may be commonly disposed on the first to third intermediate layers 640a, 640b, and 640c. According to one exemplary embodiment, a transmissive area 605 for transmitting external light may be disposed in an area adjacent to the third sub-pixel area Pb. According to one exemplary embodiment, light which is introduced through the transmissive area 605 may be detected after being converted into a specific wavelength band through the light receiving module area Qs.

According to various exemplary embodiments, the first to third pixel electrodes 630a, 630b, and 630c may be reflective electrodes including a reflective layer. For example, the reflective layer may include at least any one element selected from a group consisting of silver (Ag), magnesium (Mg), aluminum (Al), platinum (Pt), palladium (Pd), gold (Au), nickel (Ni), neodymium (Nd), iridium (Ir), and chromium (Cr). A transparent or semi-transparent electrode layer formed of at least any one element selected from a group consisting of Indium Tin Oxide (ITO), Indium Zinc Oxide (IZO), Zinc Oxide (ZnO), Indium Oxide (In2O3), Indium Gallium Oxide (IGO), and Aluminum Zinc Oxide (AZO) may be further disposed on the reflective layer.

According to various exemplary embodiments, the first to third intermediate layers 640a, 640b, and 640c may include organic light emitting layers which emit light of a first color, a second color, and a third color, respectively. According to one exemplary embodiment, the organic light emitting layer may be disposed between a pair of common layers laminated vertically. According to one exemplary embodiment, one common layer may include a Hole Injection Layer (HIL) and/or a Hole Transport Layer (HTL). According to one exemplary embodiment, the other common layer may include an Electron Transport Layer (ETL) and/or an Electron Injection Layer (EIL). However, the present invention is not limited thereto, and thus the common layer may further include various functional layers while including the organic light emitting layer. According to one exemplary embodiment, the first to third colors described above may be red, green, and blue, respectively. However, the present invention is not limited thereto, and thus a combination of various colors other than red, green, and blue may be used as long as white light can be emitted.

According to various exemplary embodiments, the counter electrode 650 may include a transparent or semi-transparent electrode, may include at least one material selected from silver (Ag), aluminum (Al), magnesium (Mg), lithium (Li), calcium (Ca), LiF/Ca, LiF/Al, MgAg, or CaAg, and may be formed of a thin film having a thickness of several to several tens of nm. According to one exemplary embodiment, light emitted from the first to third organic light emitting layers included in the first to third intermediate layers 640a, 640b, and 640c may be output in a direction of the counter electrode 650 either directly or by being reflected by the first to third pixel electrodes 630a, 630b, and 630c.

According to various exemplary embodiments, the first to third sub-pixel areas Pr, Pg, and Pb may include first to third circuit portions PCr, PCg, and PCb, respectively. According to one exemplary embodiment, the first to third circuit portions PCr, PCg, and PCb may include electrical connecting members electrically connected respectively to the first to third pixel electrodes 630a, 630b, and 630c. According to one exemplary embodiment, the electrical connecting member may include a Thin Film Transistor (TFT) or a Low Temperature Passivation Transistor (LTPT). According to one exemplary embodiment, the first, second, and third circuit portions may be electrically connected respectively to the first, second, and third pixel electrodes 630a, 630b, and 630c via an insulating layer 620. According to one exemplary embodiment, an encap layer 68 may be laminated on an upper portion of the counter electrode 650.

According to various exemplary embodiments, the light receiving module area Qs may include a light converting member 604 for converting light which is introduced from the outside via the transmissive area 605 or reflected by an external object (e.g., a finger, etc.) in proximity to the display and an optical sensor 603 which detects an amount of light of a specific wavelength band which has passed through the light converting member. According to one exemplary embodiment, when the optical sensor 603 is used as a fingerprint recognition sensor, a fingerprint recognition function may be performed by detecting a different amount of light reflected on the basis of a fingerprint formed on a user's finger.

According to various exemplary embodiments, the light converting member 604 may include a quantum dot material. According to one exemplary embodiment, a quantum dot is particles in which hundreds to thousands of atoms are gathered, and may be a semiconductor crystal in which a quantum is synthesized in unit of nanometers (nm). For example, when external light is passed through the quantum dot, various colors may be expressed depending on a particle size even if the particles have the same component. According to one exemplary embodiment, the quantum dot semiconductor crystal may utilize elements in which such a characteristic is strong, and the elements may include InSe, CdSe, InP, InSE, ZnO, CdSe/ZnS, ZnSe/ZnS, ZnSe, InAs/GaAs, PbS, EuS, CdS, PbSe/CdSe, $CdTe_xSe_x/Cd_xZn_xS$, or the like. According to one exemplary embodiment, a size of the quantum dot crystals may be formed in the range of 1 nm to 20 nm.

According to various exemplary embodiments, the light converting member 604 may pass only infrared light having a wavelength of at least 750 nm while passing incident light. According to one exemplary embodiment, the optical sensor 603 may include an InfraRed (IR) sensor for detecting such infrared light. However, the present invention is not limited thereto, and thus the light converting member 604 may pass the light by converting into light having a wavelength of various desired bands according to a crystal structure of the quantum dot. Therefore, the optical sensor 603 may also be configured with a corresponding optical sensor for detecting only the light of this specific wavelength band.

According to various exemplary embodiments, a light receiving module including the light converting member 604 and the optical sensor 603 may be disposed inside a display module (e.g., a display panel). According to one exemplary embodiment, the light receiving module may be disposed in accordance with a Black Mask (BM) area of each pixel when it is applied to an Organic light Emitting Display (OLED, including an AMOLED) as in the aforementioned exemplary embodiments. According to one exemplary embodiment, the light receiving module may be disposed in accordance with a BM area of a color filter when it is applied to a Liquid Crystal Display (LCD). However, the present invention is not limited thereto, and thus may be disposed to various positions capable of converting emitted light of the display into a specific wavelength band when the light is re-incident by being reflected by an external object (e.g., a finger), and capable of detecting an amount of the converted light. For example, the light receiving module may be disposed on the same plane on a substrate on which the plurality of pixels of the display are disposed. According to one exemplary embodiment, the light receiving module may be disposed to a position (e.g., an upper area of the display module) which is different from a position of the substrate on which the plurality of pixels of the display are disposed.

According to various exemplary embodiments, the light converting member 604 may be disposed to hide the optical sensor 603 disposed for each pixel. According to one exemplary embodiment, the light converting member 604 may be disposed to a position which is substantially vertically overlaid with the optical sensor 603. According to one exemplary embodiment, the light converting member 604 may be disposed to an optimal position where light reflected by an external object can be converted. According to one exemplary embodiment, the light converting member 604 is disposed to a position of a film corresponding to each of the plurality of pixels, and the film may be aligned at an upper portion of the display.

According to various exemplary embodiments, the electronic device may measure a light leakage value of each pixel to acquire a brightness and/or an offset value for each color. For example, the light leakage value may include a value which is received directly by an optical sensor over a partition 670 for preventing leakage of light emitted from each pixel without having to convert light through a light converting member. According to one exemplary embodiment, when the external object is recognized (e.g., fingerprint recognition), the electronic device may extract accurate detection data of which a noise has been removed by canceling leakage light to be interfered. According to one exemplary embodiment, in the fingerprint recognition, the electronic device may compensate for the light amount by using the pre-acquired offset value on the basis of a display image of a touch area of a finger on the display. According to one exemplary embodiment, the electronic device may cancel an optical interference noise by expressing a specific brightness and/or color in the touch area of the finger on the display.

According to various exemplary embodiments, the display 600 is capable of converting light which is emitted from each unit pixel and is re-introduced by being reflected by an external object (e.g., a finger, etc.) into a specific wavelength band, and is capable of detecting a light amount of the converted light, thereby being able to be utilized as various sensors.

According to various exemplary embodiments, the display 600 may be utilized as an optical touch screen. According to one exemplary embodiment, since the light receiving module having the light converting member 604 and the optical sensor 603 is included in each unit pixel of the display 600, a touch may be induced to be more sensitive than that of a touch sensor having the conventional electrode arrangement type structure. In this case, a separate touch sensor 602 disposed on a rear side of the window 601 of the display 600 may be unnecessary.

According to various exemplary embodiments, the display 600 may be utilized as an illumination sensor. According to one exemplary embodiment, the display 600 may drive only the light receiving module included in pixels provided in the entire area or a part of the area to measure an ambient brightness, and may be induced to perform a pre-set function of the electronic device in accordance with a level of the measured ambient brightness. For example, the electronic device may detect the ambient brightness by using the display, and may flexibly adjust the brightness of the display according to a detected parameter.

According to various exemplary embodiments, the display 600 may be utilized as a proximity sensor. According to one exemplary embodiment, the display 600 may drive only the light receiving module provided in the pixels included in the entire area or the part of the area. A light source emitted from each pixel may be reflected, and an approach of the external object may be detected depending on a light reception amount of received light.

According to various exemplary embodiments, the display 600 may be utilized as a heart rate sensor (an HR sensor). According to one exemplary embodiment, a light emitting portion for measuring a heart rate may be disposed to a corresponding position with respect to each pixel or several pixels, and light emitted from the light emitting portion may be reflected to a human body (e.g., a finger). According to one exemplary embodiment, the optical sensor 603 included in the light receiving module may be utilized as a light receiving sensor for detecting the reflected light. In this case, the display may be used as the heart rate sensor by measuring a blood flow of the human body by detecting the light received by the light receiving sensor.

Figure 7:
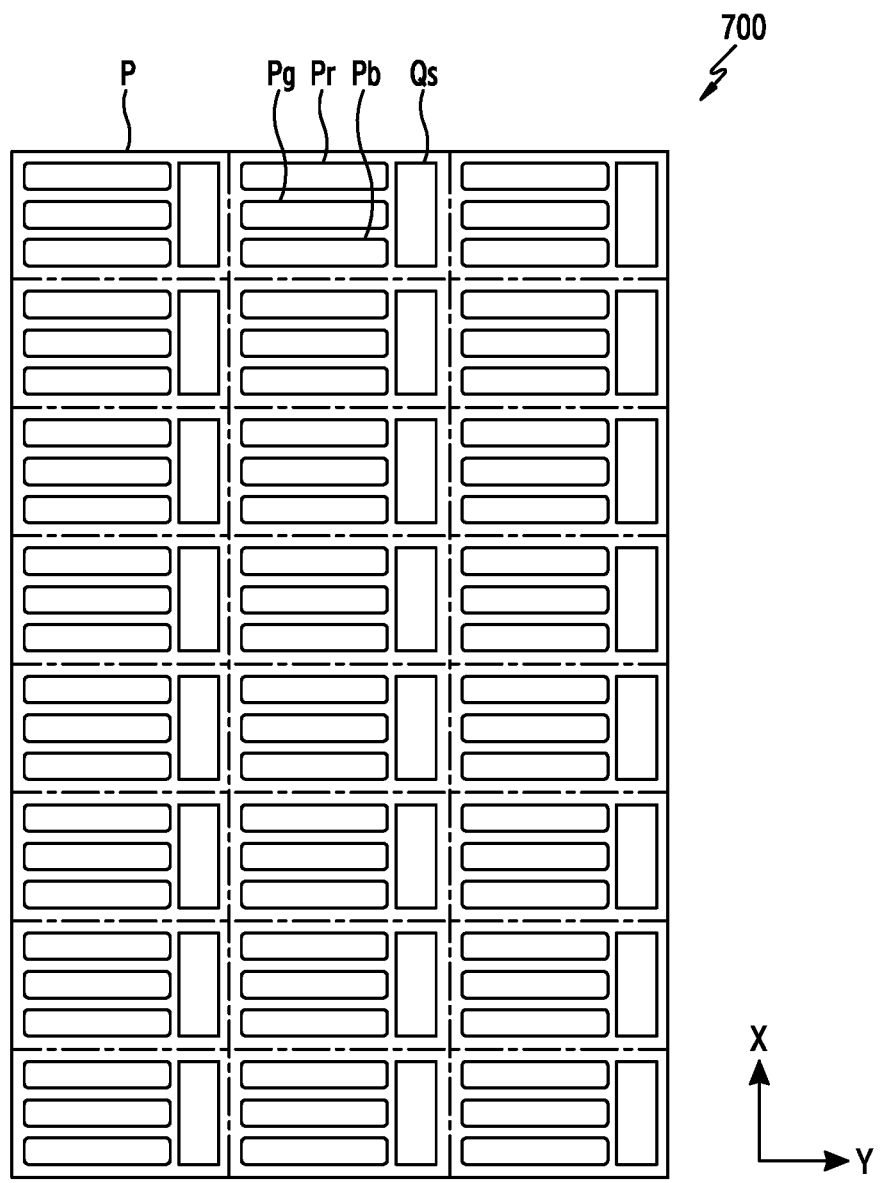
FIG. 7 is a schematic view illustrating a structure of a display according to various exemplary embodiments of the present invention.

FIG. 7 is a schematic view illustrating a structure of a display 700 according to various exemplary embodiments of the present invention.

The display 700 of FIG. 7 may be similar to the display 301 of FIG. 3A and FIG. 3B or may be another example of the display. In the description of FIG. 7, structures of the light converting member and optical sensor disposed to the corresponding circuit portion and light receiving module disposed in each sub-pixel area are the same as those of the above-described exemplary embodiments, and thus will not be described for simplicity.

Although it is described that a light receiving module area Qs according to exemplary embodiments of the present invention is disposed on a display including a plurality of pixels disposed in an RGB manner, the present invention is not limited thereto. For example, the light receiving module area Qs according to the exemplary embodiments of the present invention may also be disposed to a display including a plurality of pixels disposed in a pen-tile RGBG or pen-tile RGBW (e.g., WOLED) manner.

Referring to FIG. 7, the display 700 may include a plurality of pixels. Each of the pixels P included in the plurality of pixels may include areas disposed sequentially along a first direction X, that is, a first sub-pixel area Pr for emitting light of a first color, a second sub-pixel area Pg for emitting light of a second color different from the first color, and a third sub-pixel area Pb for emitting light of a third color different from the first color and the second color. According to one exemplary embodiment, each pixel P may include the light receiving module area Qs for receiving external light in a second direction Y extended to the first sub-pixel area Pr, the second sub-pixel area Pg, and the third sub-pixel area Pb.

According to various exemplary embodiments, the plurality of pixels P may be arranged in a matrix form on a substrate (e.g., 610 of FIG. 6), and a specific number of the pixels may be disposed along the first direction X and a second direction Y on the basis of a resolution. The first direction X may be a long-side direction of the display 301 of FIG. 3A and FIG. 3B, and the second direction Y may be substantially perpendicular to the first direction X and may be a short-side direction of the display 301 of FIG. 3A and FIG. 3B. According to one exemplary embodiment, the first sub-pixel area Pr, second sub-pixel area Pg, and third sub-pixel area Pb included in the plurality of pixels P disposed along the first direction X may be disposed to be adjacent to the light receiving module area Qs of another pixel P along the second direction Y. According to one exemplary embodiment, the light receiving module area Qs included in each pixel P may be disposed to be adjacent to the light receiving module area Qs of another pixel P disposed to be adjacent in the first direction X.

According to various exemplary embodiments, each of the first to third sub-pixel areas Pr, Pg, and Pb may emit light of different colors, i.e., the first color to the third color, and each of the first color to the third color may be, for example, red (R), green (G), and blue (B). However, the present invention is not limited thereto, and thus any combination may be possible as long as white light can be realized by combining the first color to the third color.

According to various exemplary embodiments, although the light receiving module area Qs is disposed in a right BM area of each pixel P, the present invention is not limited thereto. For example, the light receiving module area Qs may be disposed to an upper area or left area of each pixel or between sub-pixel areas included in each pixel.

According to various exemplary embodiments, the first to third sub-pixel areas Pr, Pg, and Pb may be disposed in various forms in which they are adjacent to each other instead of a matrix form, and the light receiving module area Qs may be disposed in various Black Matrix (BM) areas in which the first to third sub-pixel areas Pr, Pg, and Pb are not disposed in one pixel area P.

FIG. 8A to FIG. 8D illustrate various arrangements of a light receiving module area in a display according to various exemplary embodiments of the present invention.

A display 800 of FIG. 8A to FIG. 8D may be similar to the display 301 of FIG. 3A and FIG. 3B, the display 400 of FIG. 4, or the display 600 of FIG. 6, or may be another example of the display. Although it is described that a light receiving module area Qs according to exemplary embodiments of the present invention is disposed on a display including a plurality of pixels disposed in an RGB manner, the present invention is not limited thereto. For example, the light receiving module area Qs according to the exemplary embodiments of the present invention may also be disposed to a display including a plurality of pixels disposed in a pen-tile RGBG or pen-tile RGBW (e.g., WOLED) manner.

According to various exemplary embodiments, FIG. 8A to FIG. 8D describe an arrangement relation of the light receiving module area Qs of a display including an Organic Light Emitting Diode (OLED). According to one exemplary embodiment, FIG. 8A to FIG. 8D illustrate one pixel of the display including the light receiving module area Qs.

Referring to FIG. 8A to FIG. 8D, the display 800 may include a first layer 810, a second layer 820 disposed above the first layer, a third layer 830 disposed above the second layer, and a fourth layer 840 disposed above the third layer. According to one exemplary embodiment, the first layer 810 may include a substrate (e.g., 610 of FIG. 6). According to one exemplary embodiment, the substrate may include a plurality of circuit portions (e.g., the first to third circuit portions PCr, PCg, and PCb of FIG. 6). According to one exemplary embodiment, the plurality of circuit portions may include a Low Temperature Passivation Transistor (LTPT).

According to various exemplary embodiments, the second layer 820 may be disposed above the substrate and provided with power supplied from each of the plurality of circuit portions, and may include a plurality of pixel electrodes (e.g., 630a, 630b, and 630c of FIG. 6) divided by a Pixel Define Layer (PDL), a counter electrode (e.g., 350 of FIG. 6) disposed above a pixel electrode, and an intermediate layer (e.g., 640a, 640b, and 640c of FIG. 6) disposed between the pixel electrode and the counter electrode.

According to various exemplary embodiments, the third layer 830 may include an encap layer (e.g., 68 of FIG. 6).

According to various exemplary embodiments, the fourth layer 840 may include a window (601 of FIG. 6) disposed to an outer surface of the display 800. According to one exemplary embodiment, the fourth layer 840 may include not only the window but also a touch sensor, a polarizing plate, or an adhesive member (OCA and/or PSA).

According to various exemplary embodiments, the display 800 includes a plurality of pixels. Each pixel may include a first sub-pixel area Pr, a second sub-pixel area Pg, and a third sub-pixel area Pb. According to one exemplary embodiment, the light receiving module area Qs may be disposed in a BM area between the first sub-pixel area Pr and the second sub-pixel area Pg. However, the present invention is not limited thereto, and thus the light receiving module area Qs may be disposed in various BM areas which exist between respective sub-pixel areas. In addition, the light receiving module area Qs may be disposed in a BM area between respective pixels.

Figure 8A:
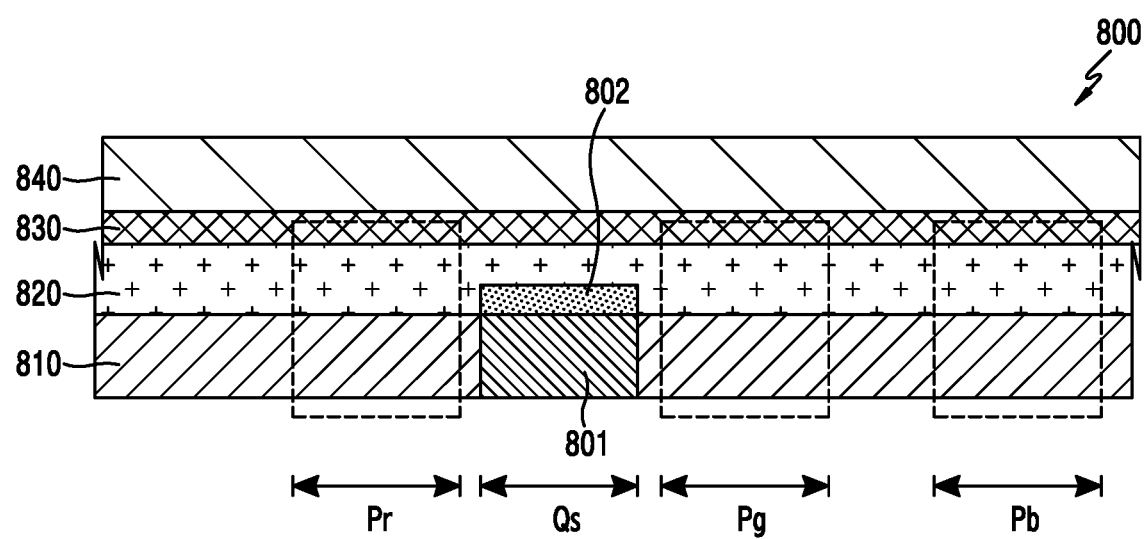
FIG. 8A to FIG. 8D illustrate various arrangements of a light receiving module area in a display according to various exemplary embodiments of the present invention.

Referring to FIG. 8A, an optical sensor 801 may be disposed to the first layer 810. According to one embodiment, when the first layer 810 is formed of a substrate, the optical sensor 801 may be disposed in such a manner that it is mounted together with a plurality of circuit portions on the substrate. According to one embodiment, a light converting member 802 may be disposed to the second layer 820. According to one embodiment, the light converting member 802 may be formed together when a pixel electrode included in the second layer 820 is formed. According to one embodiment, the light converting member 802 may be disposed to an area vertically overlaid with the optical sensor 801. According to one embodiment, the light converting member 802 may be disposed not only to the second layer 820 but also to the third layer 830 used as an encap layer.

Figure 8B:
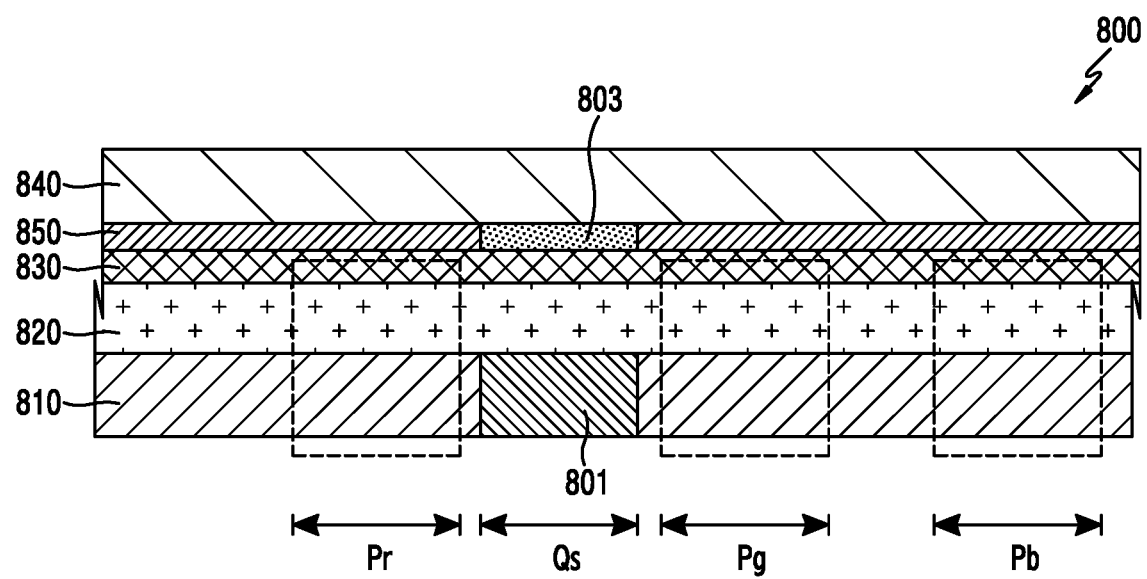

Referring to FIG. 8B, the light converting member 803 may be disposed to a fifth layer 850 separately provided. According to one exemplary embodiment, the fifth layer 850 may be formed of a transparent material (e.g., SiO2, etc.), and may be disposed to a position vertically overlaid with the optical sensor 801 disposed to the first layer 810. According to one exemplary embodiment, the fifth layer 850 may be disposed between the third layer 830 used as the encap layer and the fourth layer 840 used as an outer surface of the display. According to one exemplary embodiment, the fifth layer 850 may be implemented in a form of a film, and may be disposed to be aligned with positions corresponding to a plurality of optical sensors 801.

Figure 8C:
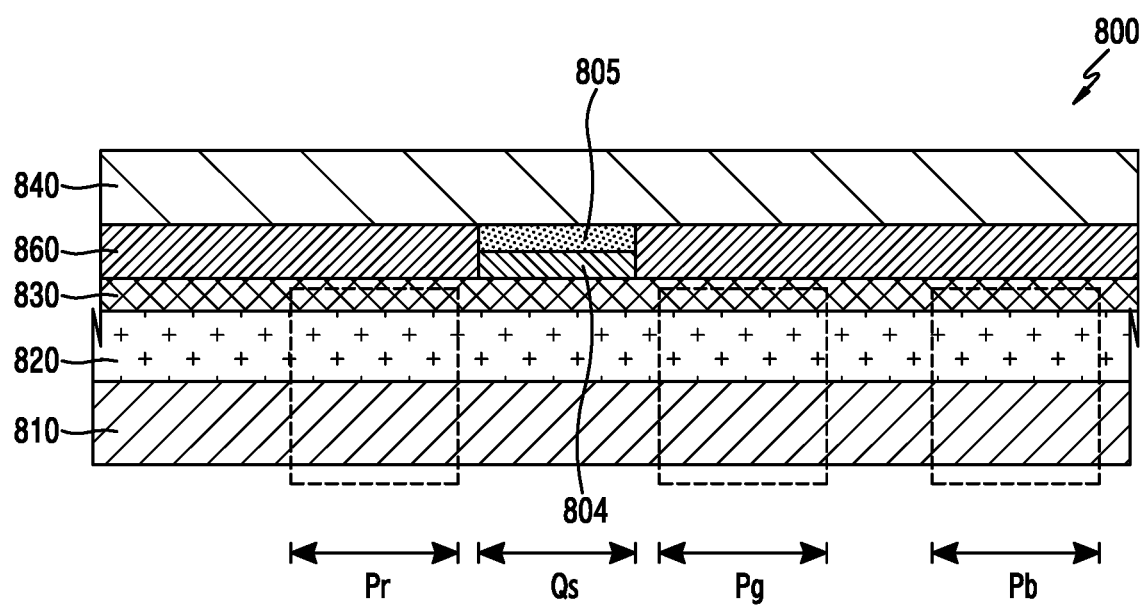

Referring to FIG. 8C, an optical sensor 804 and a light converting member 805 may be disposed to a sixth layer 860 separately provided. According to one exemplary embodiment, the sixth layer 860 may be formed of a transparent material (e.g., SiO2, etc.), and the optical sensor 804 and the light converting member 805 may be vertically overlaid in the sixth layer 860 and may be disposed to be in contact or not in contact with each other. According to one exemplary embodiment, the sixth layer 860 may be disposed between the third layer 830 used as an encap layer and the fourth layer 840 used as an outer surface of the display 800. According to one exemplary embodiment, the sixth layer may be implemented in a form of a film, and may be disposed such that the plurality of optical sensors 804 and light converting members 805 are aligned with a specific interval.

Figure 8D:
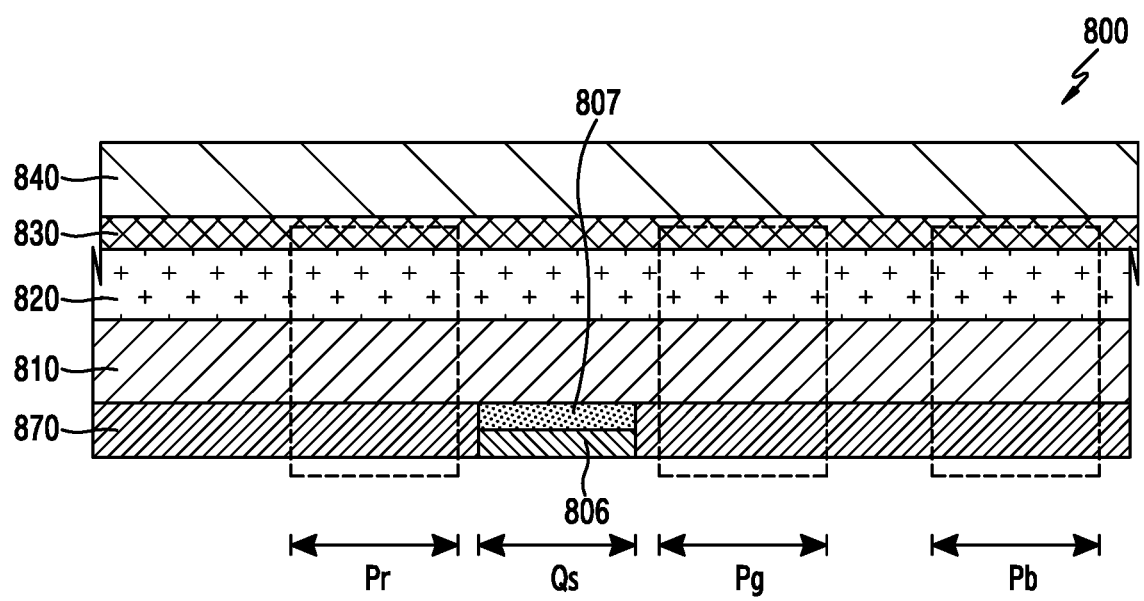

Referring to FIG. 8D, an optical sensor 806 and a light converting member 807 may be disposed to a seventh layer 870 separately provided. According to one exemplary embodiment, the seventh layer 870 may be formed of a transparent material (e.g., SiO2, etc.), and the optical sensor 806 and the light converting member 807 may be overlaid in the seventh layer 870, and may be disposed to be in contact or not in contact with each other. According to one exemplary embodiment, the seventh layer 870 may be disposed below the first layer 810 used as a substrate. According to one exemplary embodiment, the seventh layer 870 may be implemented in a form of a film, and may be disposed such that the plurality of optical sensors 806 and light converting members 807 are aligned with a specific interval.

Figure 9A:
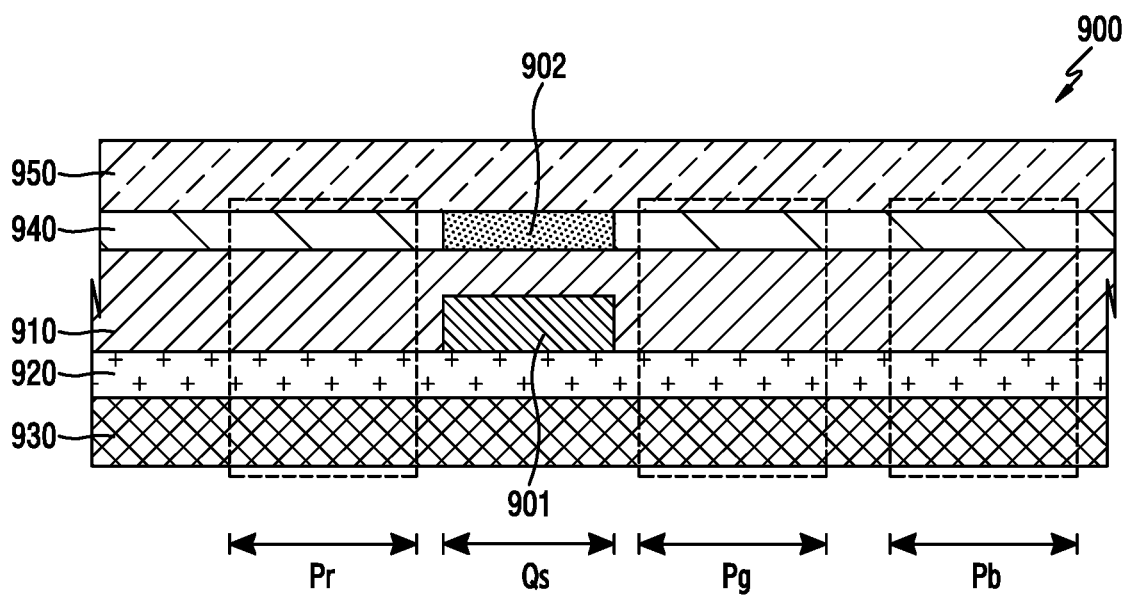
FIG. 9A to FIG. 9C illustrate various arrangements of a light receiving module area in a display according to various exemplary embodiments of the present invention.
Figure 9B:
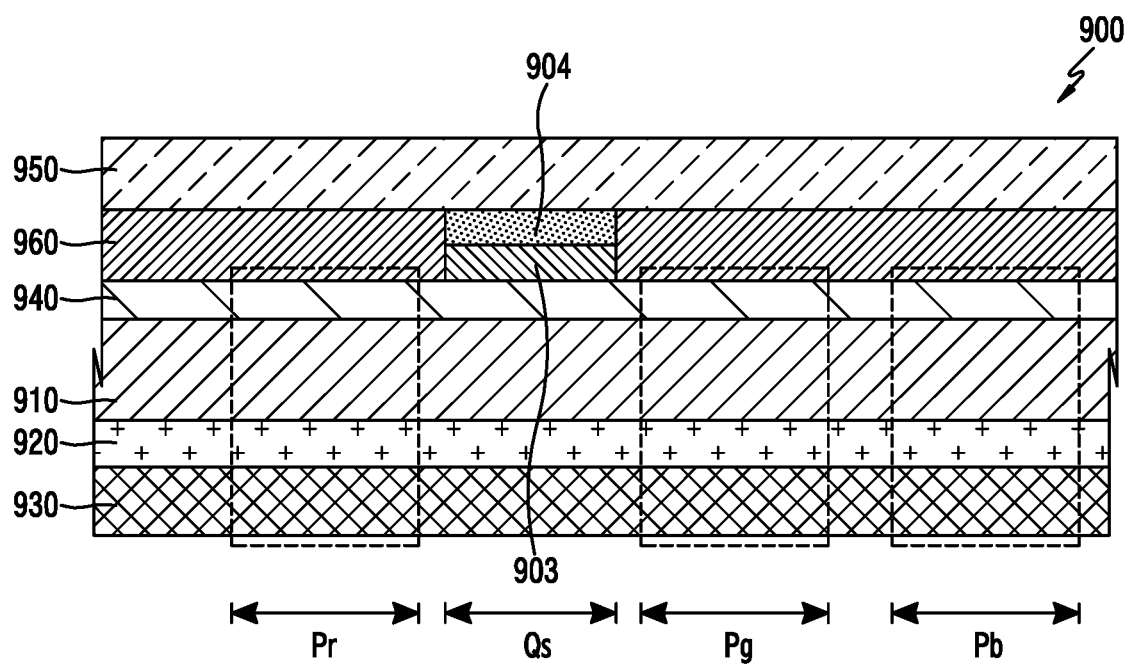
Figure 9C:
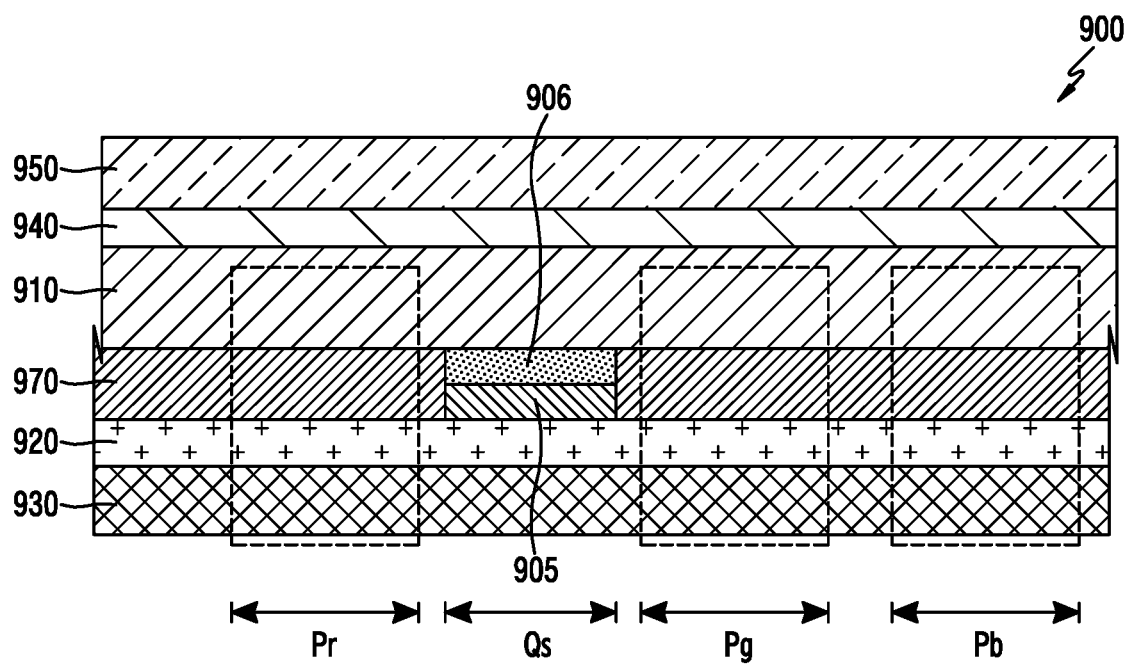

FIG. 9A to FIG. 9C illustrate various arrangements of a light receiving module area in a display according to various exemplary embodiments of the present invention.

According to various exemplary embodiments, FIG. 9A to FIG. 9C describe an arrangement relation of a light receiving module area Qs of a display including a Liquid Crystal (LC). According to one exemplary embodiment, FIG. 9A to FIG. 9C illustrate one pixel of the display including the light receiving module area Qs.

Referring to FIG. 9A to FIG. 9C, a display 900 may include a first layer 910, a second layer 920 disposed below the first layer, a third layer 930 disposed below the second layer, a fourth layer 940 disposed below the first layer 910, and a fifth layer 950 disposed below the fourth layer 940. According to one exemplary embodiment, the first layer 910 may include a substrate. According to one exemplary embodiment, the first layer 910 may include a liquid crystal. According to one exemplary embodiment, the first layer 910 may include a plurality of circuit portions for supplying power to define an arrangement of liquid crystals. According to one exemplary embodiment, the plurality of circuit portions may include a low Thin Film Transistor (TFT).

According to various exemplary embodiments, the second layer 920 may include a lower polarizing layer disposed below the substrate so that light emitted from a backlight layer disposed to a lower portion thereof is refracted by a desired angle. According to one exemplary embodiment, the third layer 930 may include a Back Light Unit (BLU) to provide light to the liquid crystal through the lower polarizing layer.

According to various exemplary embodiments, the fourth layer 940 may include a color filter layer for transmitting light emitted through the liquid crystal in a desired color. According to one exemplary embodiment, the color filter layer may include a first sub-pixel area Pr, second sub-pixel area Pg, and third sub-pixel area Pb included in one pixel.

According to various exemplary embodiments, the fifth layer 950 may include a window disposed to an outer surface of the display 900. According to one exemplary embodiment, the fifth layer 950 may include not only the window but also a touch sensor, an upper polarizing layer, or an adhesive member (OCA and/or PSA).

According to various exemplary embodiments, the display 900 includes a plurality of pixels. Each pixel may include a first sub-pixel area Pr, a second sub-pixel area Pg, and a third sub-pixel area Pb. According to one exemplary embodiment, the light receiving module area Qs may be disposed in a BM area between the first sub-pixel area Pr and the second sub-pixel area Pg. However, the present invention is not limited thereto, and thus the light receiving module area Qs may be disposed in various BM areas which exist between respective sub-pixel areas. In addition, the light receiving module area Qs may be disposed in a BM area between respective pixels.

Referring to FIG. 9A, an optical sensor 901 may be disposed to the first layer 910. According to one embodiment, when the first layer 910 is formed of a substrate, the optical sensor 901 may be disposed in such a manner that it is mounted together with a plurality of circuit portions on the substrate. According to one embodiment, a light converting member 902 may be disposed to the fourth layer 940. According to one embodiment, the light converting member 902 may be formed together in a BM area when a color filter having a specific color and included in the fourth layer 940 is formed. According to one embodiment, the light converting member 902 may be disposed to an area vertically overlaid with the optical sensor 901.

According to various exemplary embodiments, a black layer may be disposed below the optical sensor 901. According to one exemplary embodiment, the black layer may prevent light emitted from the third layer 930 (e.g., a backlight layer) used as a lower light source from being received directly by the optical sensor 901 without passing through the light converting member 902.

Referring to FIG. 9B, an optical sensor 903 and a light converting member 904 may be disposed to a sixth layer 960 separately provided. According to one exemplary embodiment, the sixth layer 960 may be formed of a transparent material (e.g., SiO2, etc.), and the optical sensor 903 and the light converting member 904 may be vertically overlaid in the sixth layer 960, and may be disposed to be in contact or not in contact with each other. According to one exemplary embodiment, the sixth layer 960 may be disposed between the fourth layer 940 used as a color filter layer and the fifth layer 950 used as an outer surface of the display 900. According to one exemplary embodiment, the sixth layer 960 may be implemented in a form of a film, and may be disposed such that the plurality of optical sensors 903 and the light converting members 904 are aligned with a specific interval.

According to various exemplary embodiments, a black layer may be disposed below the optical sensor 903. According to one exemplary embodiment, the black layer may prevent light emitted from the third layer 930 (e.g., a backlight layer) used as a lower light source from being received directly by the optical sensor 903 without passing through the light converting member 904.

Referring to FIG. 9C, an optical sensor 9805 and a light converting member 906 may be disposed to a seventh layer 970 separately provided. According to one exemplary embodiment, the seventh layer 970 may be formed of a transparent material (e.g., SiO2, etc.), and the optical sensor 905 and the light converting member 906 may be vertically overlaid in the seventh layer 970, and may be disposed to be in contact or not in contact with each other. According to one exemplary embodiment, the seventh layer 970 may be disposed between the first layer 910 used as a substrate and the second layer 920 used as a lower polarizing layer. According to one exemplary embodiment, the seventh layer 970 may be implemented in a form of a film, and may be disposed such that the plurality of optical sensors 905 and light converting members 906 are aligned with a specific interval.

According to various exemplary embodiments, a black layer may be disposed below the optical sensor 905. According to one exemplary embodiment, the black layer may prevent light emitted from the third layer 930 (e.g., a backlight layer) used as a lower light source from being received directly by the optical sensor 905 without passing through the light converting member 906.

According to various exemplary embodiments, an electronic device may include a housing including a first area facing a first direction and a second area facing a second direction. The housing may include a window formed on at least one portion of the first area. The electronic device may include a display module disposed between the window and the second area, a light converting member disposed between the window and the second area and configured to transmit light emitted from the display module in the first direction by at least partially converting a wavelength of the light reflected in the second direction by an external object of the housing, and an optical sensor disposed between the light converting member and the second area. The optical sensor may be configured to detect the object by using the light of which the wavelength is converted. According to one exemplary embodiment, the second direction may be a direction opposite to the first direction.

According to various exemplary embodiments, the light may have a first wavelength, and the optical sensor may be configured to detect light of a second wavelength. The light may be configured to be converted from the first wavelength to the second wavelength.

According to various exemplary embodiments, the object may include a finger of a user. The electronic device further may include a processor. The processor may be configured to recognize a fingerprint corresponding to the user at least partially on the basis of the light of which wavelength is converted.

According to various exemplary embodiments, the electronic device of may further include an application processor for executing an application. The processor may include a low-power processor for controlling a plurality of sensors including the optical sensor.

According to various exemplary embodiments, the light converting member may be aligned to be at least partially overlaid with the optical sensor.

According to various exemplary embodiments, conversion light converted through the light converting member may have a wavelength greater than or equal to 750 nm.

According to various exemplary embodiments, the display module may include a substrate layer including a plurality of circuit portions, an electrode layer disposed above the substrate, an encap layer disposed above the electrode layer, and an outer layer disposed above the encap layer.

According to various exemplary embodiments, the optical sensor may be disposed on the substrate layer.

According to various exemplary embodiments, the light converting member may be disposed to the electrode layer at a position at which the optical sensor and at least one portion are vertically overlaid.

According to various exemplary embodiments, the light converting member may be disposed to the encap layer at a position at which the optical sensor and at least one portion are vertically overlaid.

According to various exemplary embodiments, the display module may further include a light converting layer including at least one of the light converting member and the optical sensor.

According to various exemplary embodiments, the light converting member may be disposed between the outer layer and the encap layer or below the substrate layer.

According to various exemplary embodiments, the light converting layer may be implemented in a form of a film in which the optical sensor and the light converting member are at least partially overlaid.

According to various exemplary embodiments, the display module may include a substrate layer including a plurality of circuit portions, a liquid crystal layer disposed above the substrate, a color filter layer disposed above the liquid crystal, an outer layer disposed above the color filter layer, and a backlight layer disposed below the substrate.

According to various exemplary embodiments, the optical sensor may be disposed to the substrate layer.

According to various exemplary embodiments, the light converting member may be disposed to the color filter at a position at which the optical sensor and at least one portion are vertically overlaid.

According to various exemplary embodiments, the display module may further include a light converting layer including at least one of the light converting member and the optical sensor.

According to various exemplary embodiments, the light converting layer may be disposed between the outer layer and the color filter layer or below the substrate layer.

According to various exemplary embodiments, a back layer may be formed below the optical sensor to block light emitted from the backlight layer.

According to various exemplary embodiments, an electronic device may include a display panel including a first area in which a plurality of sub-pixels capable of expressing colors are formed and a second area different from the first area, and a light converting area aligned to correspond to the second area and configured to transmit light by converting a wavelength of the light obtained from the outside of the electronic device.

According to various exemplary embodiments, the display panel may form a first layer, and the light converting area may form a second layer.

According to various exemplary embodiments, the light converting area may be formed in the second area of the display panel.

According to various exemplary embodiments, the electronic device may further include an optical sensor, and the optical sensor may be configured to detect an external object of the electronic device by using light of which the wavelength is converted.

According to various exemplary embodiments, the object may include a fingerprint of a user. The electronic device may further include a processor. The processor may be configured to recognize a fingerprint corresponding to the user at least on the basis of the light of which the wavelength is converted.

According to various exemplary embodiments, the electronic device may further include an application processor for executing an application, and the processor may include a low-power processor for controlling the optical sensor.

According to various exemplary embodiments, the processor may provide control to perform operations of determining whether fingerprint recognition is impossible, increasing a brightness of the display panel if the fingerprint recognition is impossible, applying a weight to obtained fingerprint data after ignoring data of an outer portion of a finger contact, and performing a corresponding function by analyzing the fingerprint data to which the weight is applied.

According to various exemplary embodiments, if the fingerprint recognition is achieved by using an Application Processor (AP), the fingerprint may be recognized by using a low-power processor such as a hub sensor.

According to various exemplary embodiments, an electronic device may include a housing for forming an exterior of the electronic device. The housing may include a window formed in one portion of the housing. Inside the housing, a display module may be disposed below the window. Inside the housing, a light converting member may be disposed below the window to transmit light emitted from the display module by at least partially converting a wavelength of the light reflected by an external object of the window. Inside the housing, an optical sensor may be disposed below the light converting member. The optical sensor may be configured to detect the object by using light of which the wavelength is converted.

Figure 10:
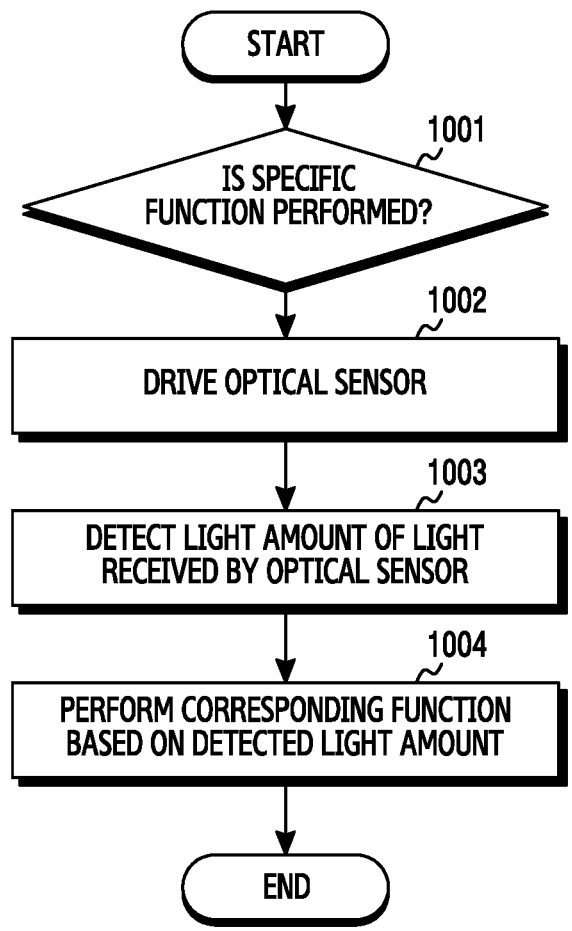
FIG. 10 is a flowchart illustrating a sensing process via a display according to various exemplary embodiments of the present invention.
Figure 11A:
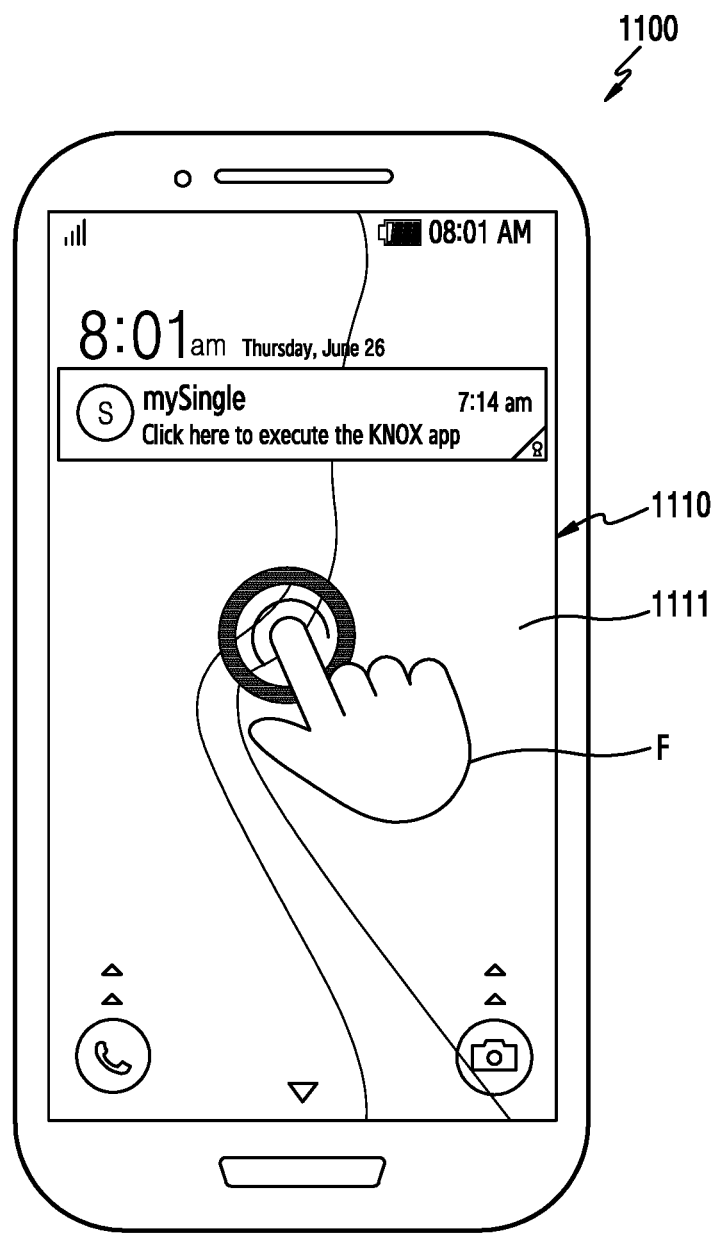
FIG. 11A and FIG. 11B illustrate an example of a state in which a display is used as a sensor according to various exemplary embodiments of the present invention.
Figure 11B:
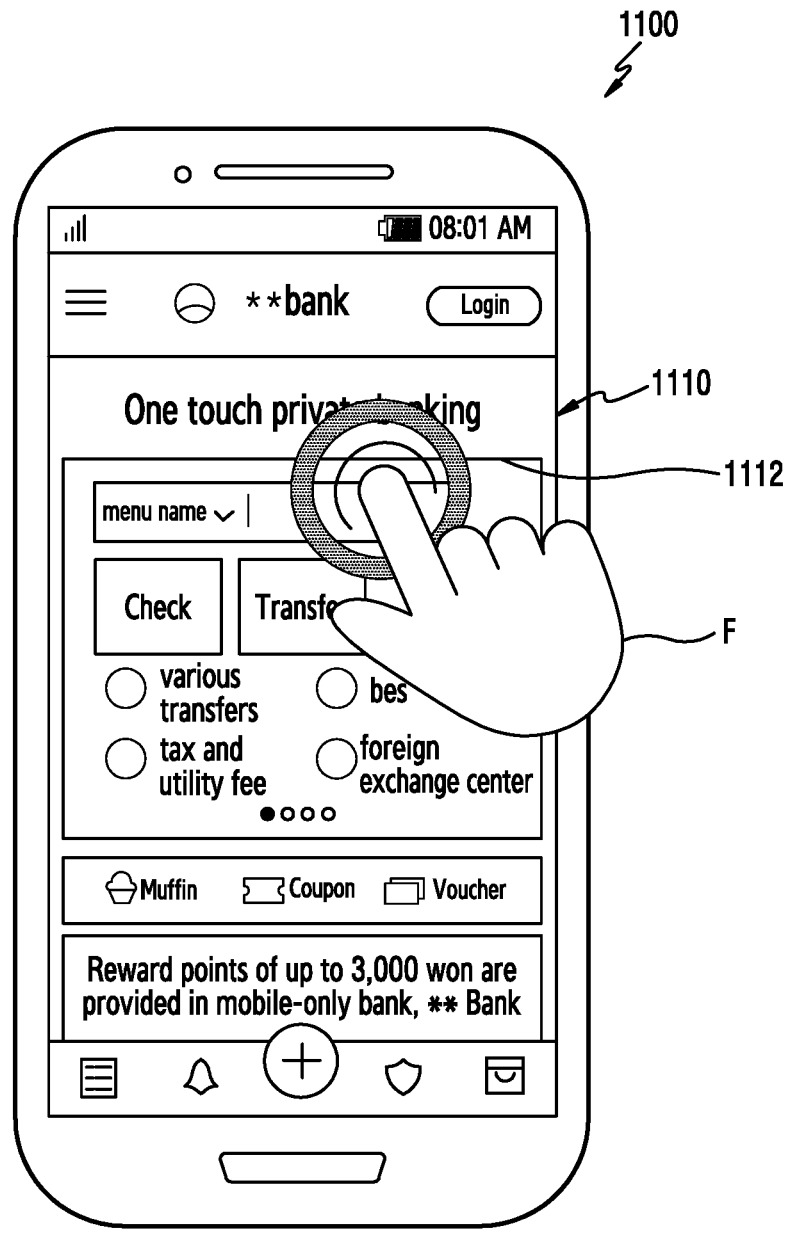

FIG. 10 is a flowchart illustrating a sensing process via a display according to various exemplary embodiments of the present invention. FIG. 11A and FIG. 11B illustrate an example of a state in which a display is used as a sensor according to various exemplary embodiments of the present invention.

Referring to FIG. 10 to FIG. 11B, in operation 1001, an electronic device may perform an operation of confirming whether a specific function is performed. According to one exemplary embodiment, the specific function may include a fingerprint recognition function, a touch sensor function, an illumination sensor function for detecting an ambient illumination, a proximity sensor function for detecting an approach of an external object, or a heart rate sensor function. For example, as shown in FIG. 11A, the specific function may include a function for releasing a lock screen 1111 displayed on a display 1110 of an electronic device 1100. According to one exemplary embodiment, as shown in FIG. 11B, the specific function may include a function for requesting an authentication of a specific application 1112 (e.g., a financial application) displayed on the display 1110 of the electronic device 1100.

In operation 1002, the electronic device may drive a plurality of optical sensors (e.g., the optical sensor 603 of FIG. 6) correspondingly disposed to the display upon confirming that the specific function has been performed. According to one exemplary embodiment, the optical sensor (e.g., the optical sensor 603 of FIG. 6) may further include a light converting member (e.g., the light converting member 604 of FIG. 6). According to one exemplary embodiment, the light converting member (e.g., the light converting member 604 of FIG. 6) may allow only light of a specific wavelength to be incident to the optical sensor (e.g., the optical sensor 603 of FIG. 6).

The electronic device may detect an amount of light received by the optical sensor (e.g., the optical sensor 603 of FIG. 6) in operation 1003, and may perform a corresponding function according to the detected light amount in operation 1004. For example, when a desired position or a randomly selected position on a screen (e.g., the lock screen 1111, the financial authentication screen 1112, etc.) displayed on the display 1110 of the electronic device 1100 is touched by a finger F, the optical sensor (e.g., the optical sensor 603 of FIG. 6) disposed to a corresponding position of the display 1110 may be reflected by the finger, and may detect light converted into a specific wavelength band via the light converting member (e.g., the light converting member 604).

According to various exemplary embodiments, the optical sensor (e.g., the optical sensor 603 of FIG. 6) may detect a light amount of incident light which has passed through the light converting member (e.g., the light converting member 604 of FIG. 6) and converted into a specific wavelength band. According to one exemplary embodiment, when the specific function is a fingerprint recognition function, the optical sensor (e.g., the optical sensor 603 of FIG. 6) may detect a light amount of incident light converted through the light converting member (e.g., the light converting member 604 of FIG. 6). According to one exemplary embodiment, the optical sensor (e.g., the optical sensor 603 of FIG. 6) may recognize a fingerprint by analyzing a difference between an amount of light reflected by a fingerprint of a finger and an amount of light reflected by a valley between ridges of the fingerprint According to one exemplary embodiment, the electronic device may perform a touch sensor function, an illumination sensor function, a proximity sensor function, or a heart rate sensor function through the detection of the optical sensor (e.g., the optical sensor 603 of FIG. 6) disposed to each pixel of the display.

Figure 12:
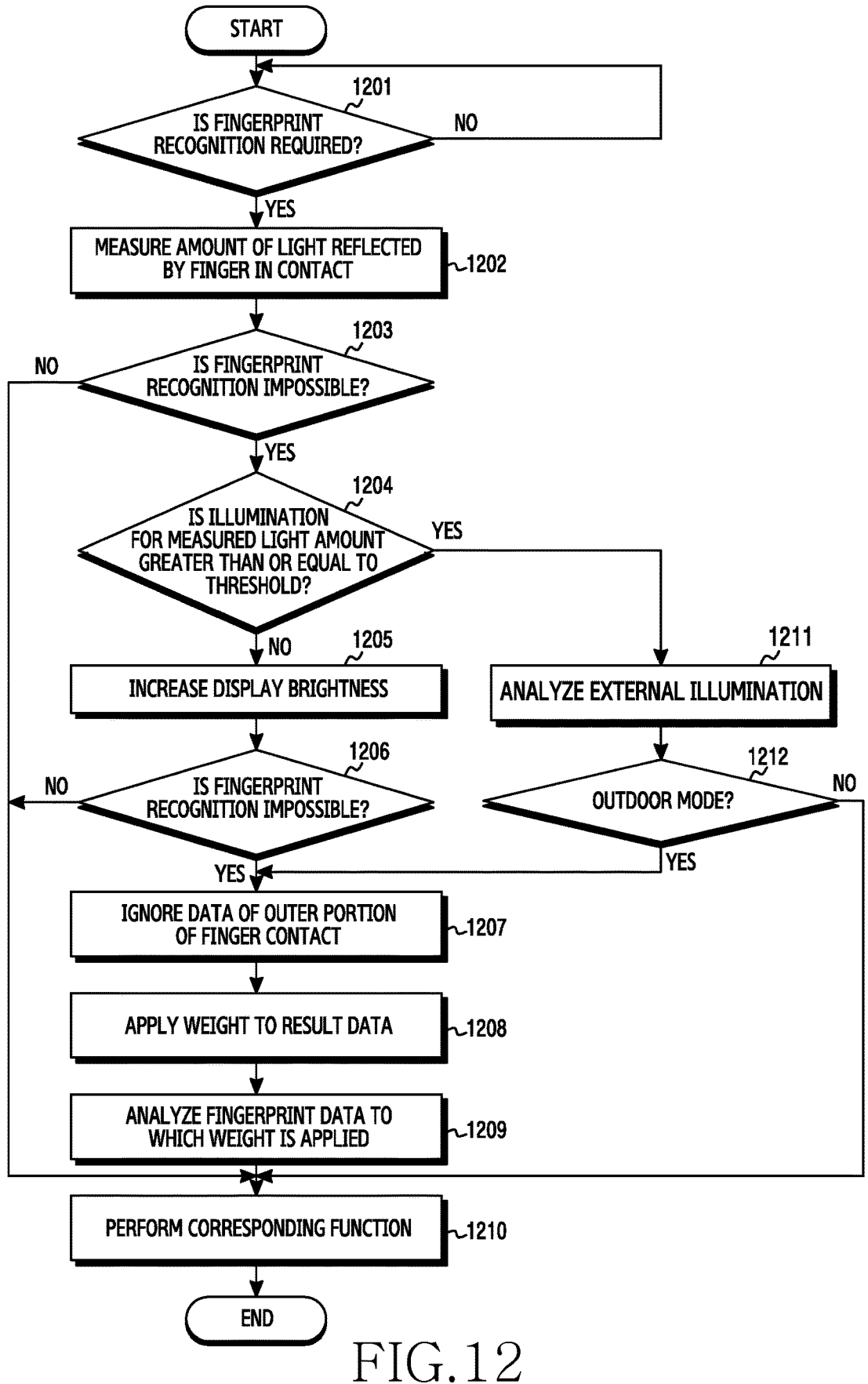
FIG. 12 is a flowchart illustrating a procedure related to fingerprint recognition correction according to various exemplary embodiments of the present invention.

FIG. 12 is a flowchart illustrating a procedure related to fingerprint recognition correction according to various exemplary embodiments of the present invention.

According to various exemplary embodiments, an optical sensor may fail to perform a fingerprint recognition function when a light amount of conversion light converted through a light converting member is insufficient or an excessive amount of light is introduced. Therefore, there is a need to adjust and correct the amount of light introduced through the light converting member.

According to various exemplary embodiments, in operation 1201, the electronic device may examine whether there is a request for fingerprint recognition. According to one exemplary embodiment, the electronic device may confirm, for example, whether there is a request for releasing a lock screen or whether there is a request for a security related authentication such as finance. If the fingerprint recognition request is confirmed, in operation 1202, the electronic device may perform an operation of measuring an amount of light reflected by a touched finger. For example, the electronic device may be reflected by a finger touched on the display, and may detect conversion light converted into a specific wavelength band through the light converting member (e.g., the light converting member 604 of FIG. 6).

In operation 1203, the electronic device may analyze the amount of light detected by the optical sensor and determine whether fingerprint recognition is possible. Thereafter, if it is determined that the fingerprint recognition is impossible, proceeding to operation 1204, it may be examined whether an illumination for a light amount measured by an optical sensor is greater than or equal to a pre-set threshold. According to one exemplary embodiment, if the illumination for the measured light amount is less than the threshold, proceeding to operation 1205, an operation of increasing a brightness of the display may be performed. According to one exemplary embodiment, if it is determined that the illumination for the measured light amount is less than the threshold, the electronic device may determine that an amount of light incident to the light converting member is insufficient, and may increase the brightness of the display so that light passes through the light converting member. According to one exemplary embodiment, in operation 1203, if it is determined that fingerprint recognition is possible, proceeding to operation 1201, the electronic device may perform a corresponding function by recognizing the fingerprint.

In operation 1206, after increasing the brightness of the display, an operation of determining whether the fingerprint recognition is possible may be performed again. According to one exemplary embodiment, if it is determined that fingerprint recognition is impossible even after increasing the brightness of the display, proceeding to operation 1207, the electronic device may perform an operation of ignoring data of an outer portion of a finger contact to measure only an amount of light reflected by the finger.

In operation 1208, the electronic device may apply a weight to fingerprint data acquired in operation 1207. In operation 1209, the electronic device may analyze the fingerprint data to which the weight is applied. According to one exemplary embodiment, the electronic device may amplify the fingerprint data acquired in operation 1207 by doubling the data so that the fingerprint data can be more favorably read. Thereafter, proceeding to operation 1210, the fingerprint may be recognized by using the fingerprint data to which the weight is applied, and thereafter a corresponding function may be performed.

On the other hand, even if the illumination for the measured light amount is greater than or equal to the threshold in operation 1204, an operation of analyzing an external illumination may be performed in operation 1211. According to one exemplary embodiment, if an outdoor mode is determined in operation 1212 on the basis of the illumination analyzed in operation 1211, proceeding to operation 1207, the electronic device may sequentially perform operations starting from an operation of ignoring the data of the outer portion of the finger contact to acquire fingerprint data for light reflected by the finger. If the outdoor mode is not determined in operation 1212, proceeding to operation 1210, the fingerprint recognition may be performed since the illumination for the measured light amount is greater than or equal to the threshold.

According to various exemplary embodiments, a method of operating an electronic device may include confirming whether a specific function is requested, detecting light converted into a specific wavelength through a light converting member disposed inside a display or in proximity to the display by means of an optical sensor, and performing a corresponding function associated with the specific function on the basis of a detected parameter.

According to various exemplary embodiments, the method may further include acquiring a brightness and/or an offset value for each color by measuring leakage light when the light emitted from at least one pixel among a plurality of pixels of the display is leaked without passing the light converting member, extracting a finally detected parameter by canceling the brightness and/or the offset value for each color from the detected parameter, and performing the corresponding function on the basis of the finally detected parameter.

According to various exemplary embodiments, the specific function may include a fingerprint recognition function, and may include an operation of canceling a noise depending on optical interference by expressing a specific brightness and/or color to a touch area of a finger when the fingerprint recognition is achieved through the light detection.

According to various exemplary embodiments, the specific function may include at least one of a fingerprint recognition function for detecting light emitted from the display by reflecting the light by the finger by means of the optical sensor through the light converting member, a touch sensor function for detecting a touch position to which a contact is made through the display by using the light converting member and the optical sensor, an illumination sensor function for detecting an ambient illumination, a proximity sensor function for detecting an approach of an external object, and a heart rate sensor function for checking a heart rate.

According to various exemplary embodiments, the specific functions may be performed such that at least two types of functions are performed together, or may be performed mutually exclusively.

Various exemplary embodiments of the present invention disclosed in the specification and the drawing are merely a specific example presented for clarity and are not intended to limit the scope of the present invention. Therefore, in addition to the embodiments disclosed herein, various changes in forms and details made without departing from the technical concept of the present invention will be construed as being included in the scope of the present invention.

What is claimed is:
1. An electronic device comprising:
a window forming at least part of outer surface of the electronic device;
a display module disposed below the window and including a pixel area and a sensing area;
a light converting member, disposed between the window and an optical sensor at the sensing area, configured to convert a wavelength of light, which is emitted from the display module and reflected by an external object, wherein the converted light is transmitted to the optical sensor; and the optical sensor, disposed below the light converting member, configured to detect the external object by using the light of which the wavelength is converted, wherein a plurality of pixels disposed at the pixel area emit light to the external object without changing a wavelength of light by the light converting member.

2. The electronic device of claim 1, wherein the light emitted from the display module has a first wavelength, and the optical sensor is configured to detect light of a second wavelength, and wherein the light emitted from the display module is configured to be converted from the first wavelength to the second wavelength.

3. The electronic device of claim 1, wherein the external object comprises a finger of a user, wherein the electronic device further comprises a processor, and wherein the processor is configured to recognize a fingerprint corresponding to the user at least partially based on the light reflected of which wavelength is converted.

4. The electronic device of claim 3, further comprising an application processor for executing an application, wherein the application processor comprises a low-power processor for controlling a plurality of sensors including the optical sensor.

5. The electronic device of claim 1, wherein the light converting member is aligned to be at least partially overlaid with the optical sensor.

6. The electronic device of claim 1, wherein conversion light converted through the light converting member has a wavelength greater than or equal to 750 nm.

7. The electronic device of claim 1, wherein the display module comprises:

a substrate layer comprising a plurality of circuit portions;
an electrode layer disposed above the substrate layer;
an encap layer disposed above the electrode layer; and
an outer layer disposed above the encap layer.

8. The electronic device of claim 7, wherein the optical sensor is disposed on the substrate layer.

9. The electronic device of claim 8, wherein the light converting member is disposed in the electrode layer or disposed in the encap layer at a position at which the optical sensor and at least one portion of the light converting member are vertically overlaid.

10. The electronic device of claim 7, wherein the display module further comprises a light converting layer comprising at least one of the light converting member and the optical sensor.

11. The electronic device of claim 10, wherein the light converting member is disposed between the outer layer and the encap layer or disposed below the substrate layer.

12. The electronic device of claim 1, wherein the display module comprises:

a substrate layer comprising a plurality of circuit portions;
a liquid crystal layer disposed above the substrate layer;
a color filter layer disposed above the liquid crystal;
an outer layer disposed above the color filter layer; and
a backlight layer disposed below the substrate.

13. The electronic device of claim 12, wherein the optical sensor is disposed in the substrate layer.

14. The electronic device of claim 12, wherein the light converting member is disposed in the color filter at a position at which the optical sensor and at least one portion of the light converting member are vertically overlaid.

15. The electronic device of claim 12, wherein a back layer is formed below the optical sensor to block light emitted from the backlight layer.

16. A method for operating an electronic device, the method comprising, operating the electronic device to confirm whether a specific function is requested;
detecting light converted into a specific wavelength through a light converting member disposed inside a display or in proximity to the display by means of an optical sensor;
performing a corresponding function associated with the specific function based on a detected parameter,
acquiring a brightness and/or an offset value for each color by measuring leakage light when light emitted from at least one pixel among a plurality of pixels of the display is leaked without passing the light converting member;
extracting a finally detected parameter by canceling the brightness and/or the offset value for each color from the detected parameter; and
performing the corresponding function based on the finally detected parameter.

* * * * *